United States Patent [19]

Graton et al.

[11] Patent Number: 5,590,750
[45] Date of Patent: Jan. 7, 1997

[54] TORSION DAMPER FOR A LOCK-UP CLUTCH, AND A LOCK-UP CLUTCH HAVING SUCH A TORSION DAMPER

[75] Inventors: Michel Graton, Paris; Fabrice Tauvron, Creteil; Rene Billet, Lamorlaye; Rabah Arhab, Perrefitte; Michel Ginaldi, Paris; Daniel Maingaud, Rigny Usse, all of France

[73] Assignee: Valeo, Paris, France

[21] Appl. No.: 244,105

[22] PCT Filed: Sep. 24, 1993

[86] PCT No.: PCT/FR93/00936

§ 371 Date: Jul. 19, 1994

§ 102(e) Date: Jul. 19, 1994

[87] PCT Pub. No.: WO94/07058

PCT Pub. Date: Mar. 31, 1994

[30] Foreign Application Priority Data

Sep. 24, 1992 [FR] France ................................ 92 11400
May 17, 1993 [FR] France ................................ 93 05923
Aug. 16, 1993 [FR] France ................................ 93 10004

[51] Int. Cl.⁶ .................... F16H 45/02; F16F 15/12
[52] U.S. Cl. ................. 192/3.29; 192/212; 464/67
[58] Field of Search ..................... 192/3.28, 3.29, 192/3.3, 106.2, 212; 464/66, 67

[56] References Cited

U.S. PATENT DOCUMENTS

| | | | |
|---|---|---|---|
| 4,875,562 | 10/1989 | Fujimoto | 192/3.28 |
| 4,919,241 | 4/1990 | Koshimo | 192/3.29 |
| 4,987,980 | 1/1991 | Fujimoto | 192/3.28 |
| 5,105,921 | 4/1992 | Fujimoto | 192/3.28 |
| 5,119,911 | 6/1992 | Bochot et al. | 192/3.29 |
| 5,141,474 | 8/1992 | Fujimoto | 464/67 |
| 5,195,622 | 3/1993 | Tauvron et al. | 192/3.29 |
| 5,209,330 | 5/1993 | Macdonald | 192/3.29 |

FOREIGN PATENT DOCUMENTS

| | | | |
|---|---|---|---|
| 0240166 | 10/1987 | European Pat. Off. | |
| 0358318 | 3/1990 | European Pat. Off. | |
| 0480267 | 4/1992 | European Pat. Off. | |
| 586304 | 3/1994 | European Pat. Off. | 192/3.28 |
| 2634849 | 2/1990 | France. | |
| 2635844 | 3/1990 | France. | |
| 2690214 | 10/1993 | France. | |
| 3934798 | 4/1991 | Germany. | |
| 2255395 | 11/1992 | United Kingdom. | |
| 93/13338 | 7/1993 | WIPO. | |

*Primary Examiner*—Richard M. Lorence
*Attorney, Agent, or Firm*—Longacre & White

[57] ABSTRACT

The torsion damper for a lock-up clutch (4) comprises two coaxial parts (40, 60) which are movable with respect to each other against circumferentially acting springs (50), namely an input part in the form of a guide ring (40) and an output part (60) called a damper plate, in which the guide ring (40) comprises a retaining portion (42, 142 . . . ) and engagement portions (45, 145 . . . ) for the external retention of the springs (50) and for their engagement, respectively, while the damper plate (60) also has engagement portions (65, 165 . . . ) for engagement with the springs (50). The damper plate (60) has a retaining portion (61, 161 . . . ) in the form of a half shell, the engagement portions of the damper plate (60) are carried by the said retaining portion of the damper plate (60), and the retaining portions of the guide ring (40) and of the damper plate (60) are offset axially with respect to each other.

25 Claims, 26 Drawing Sheets

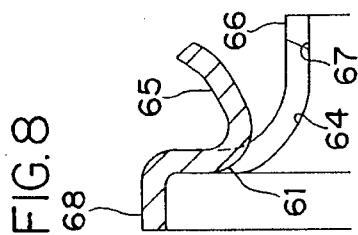
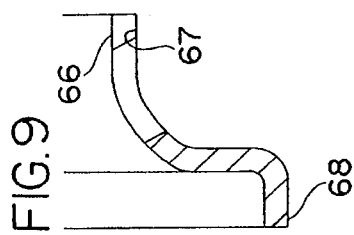
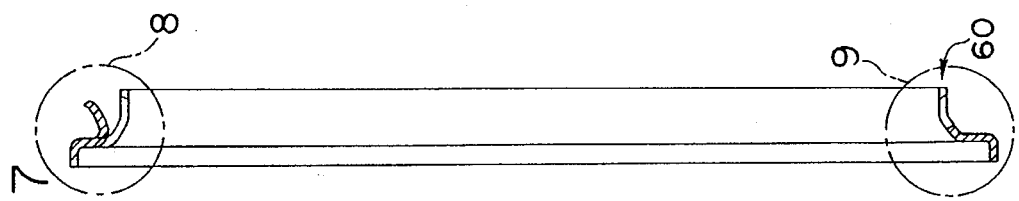
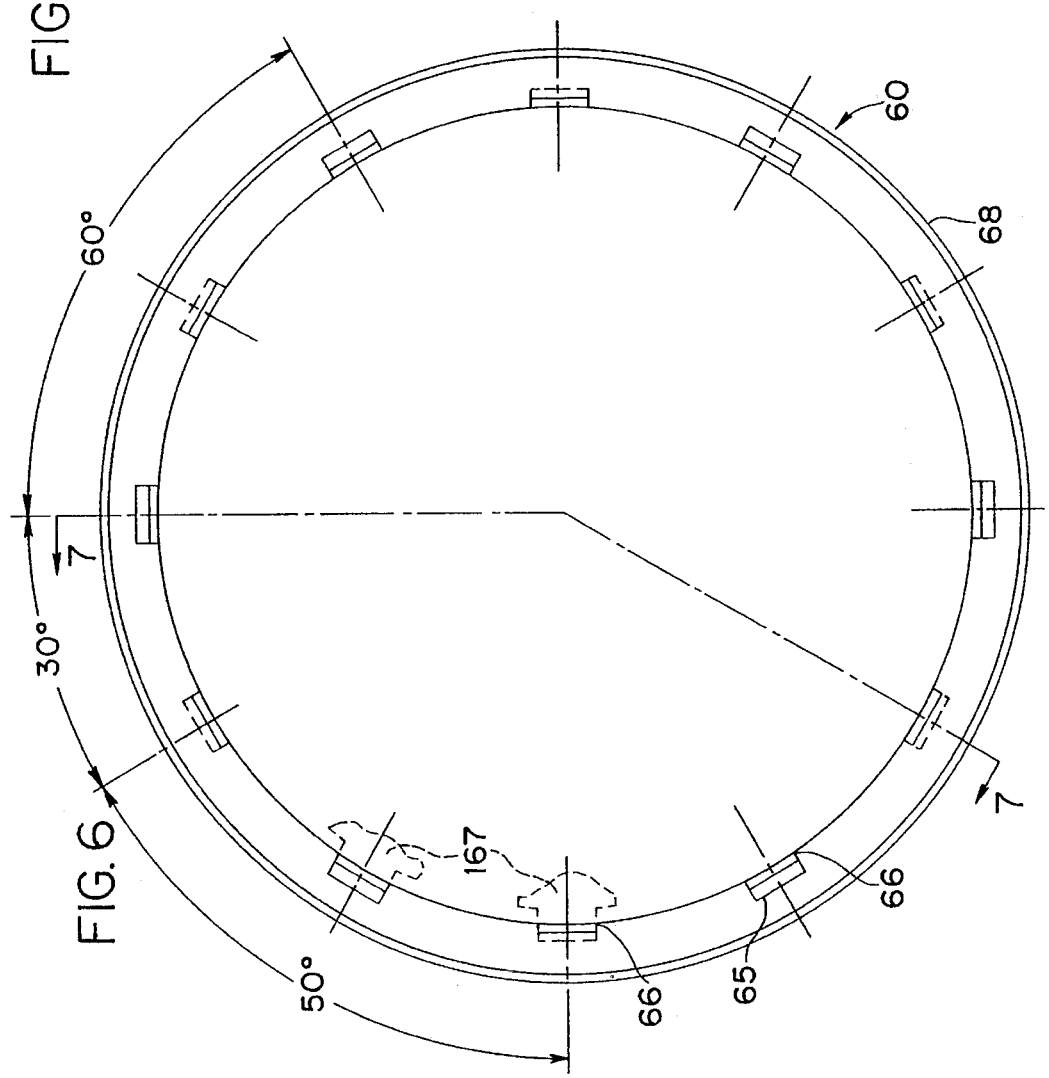

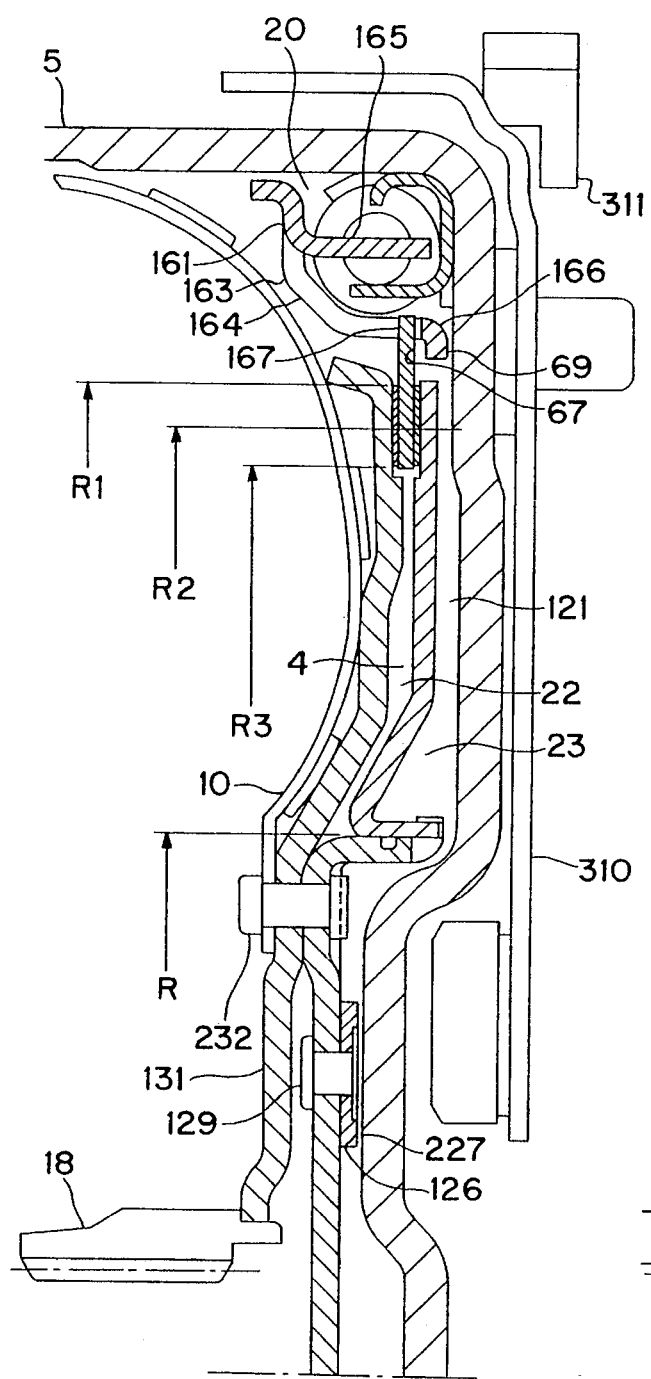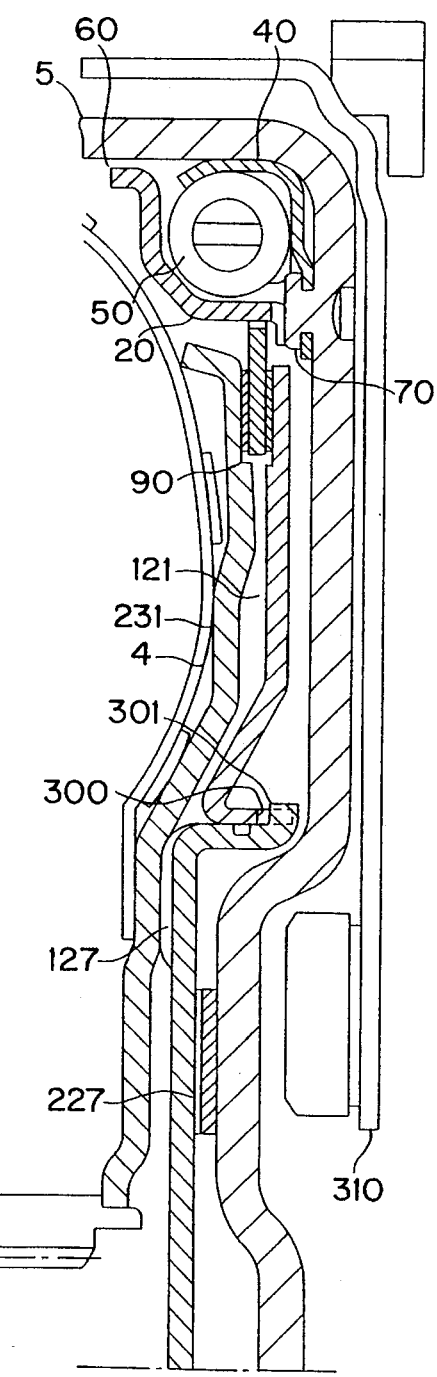

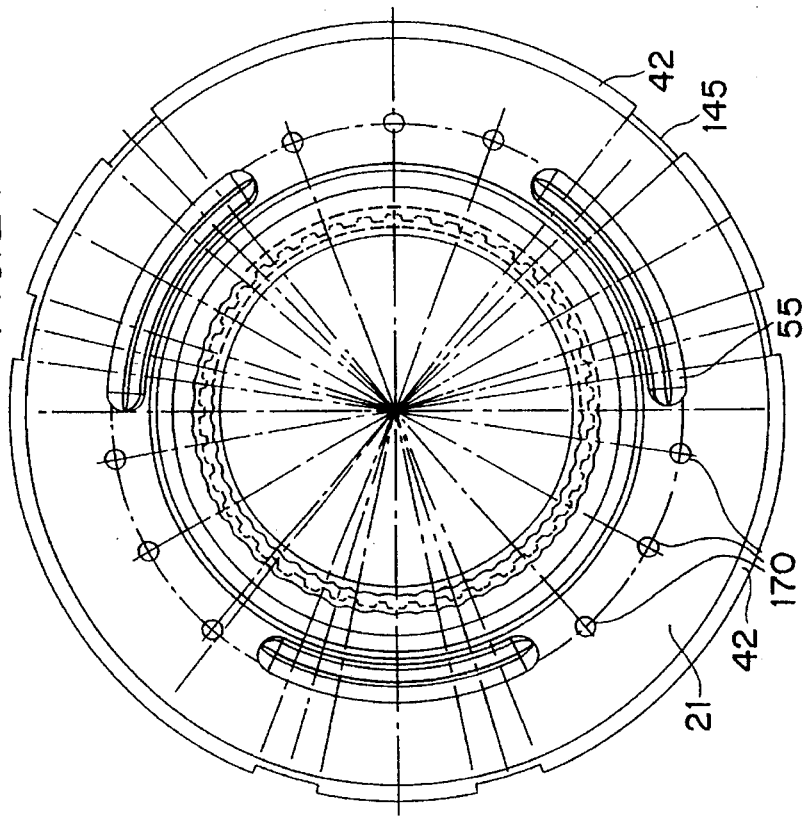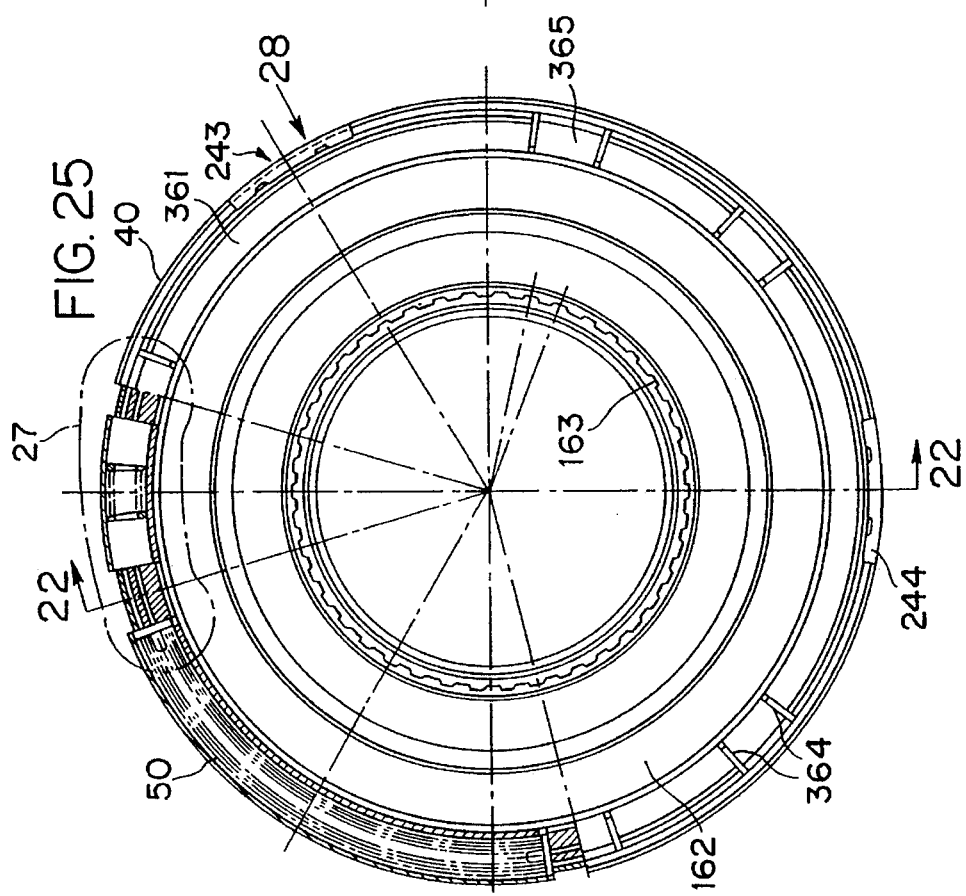

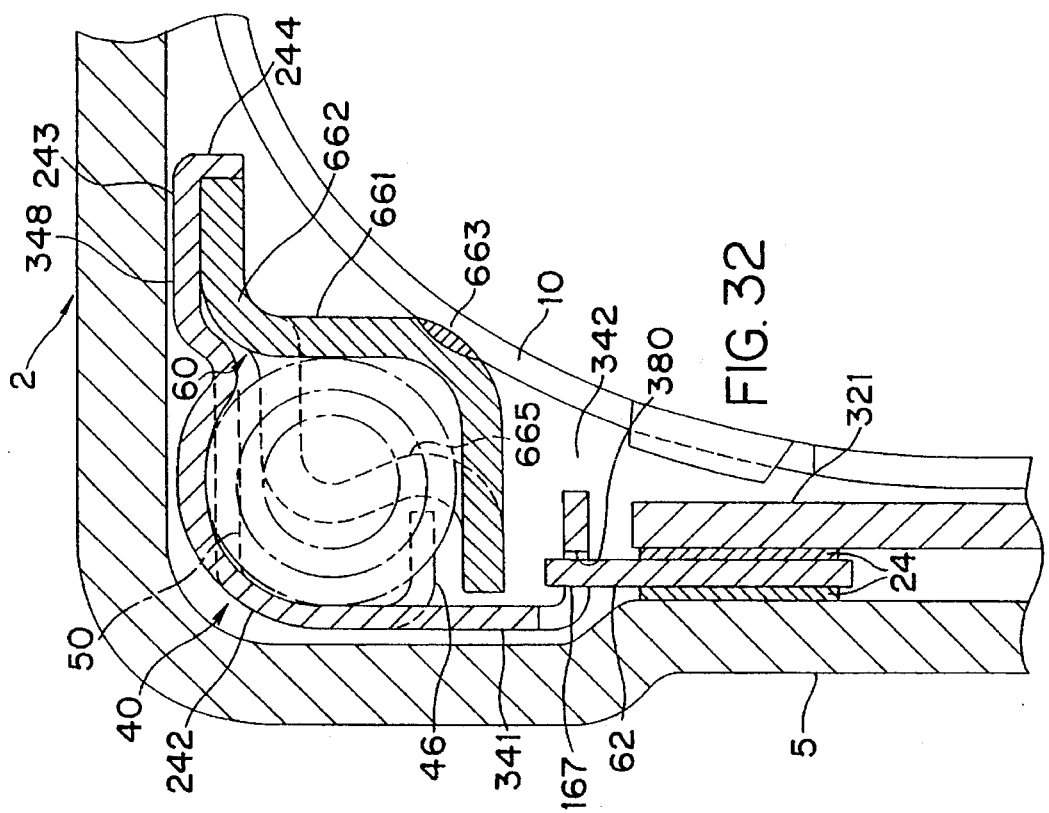
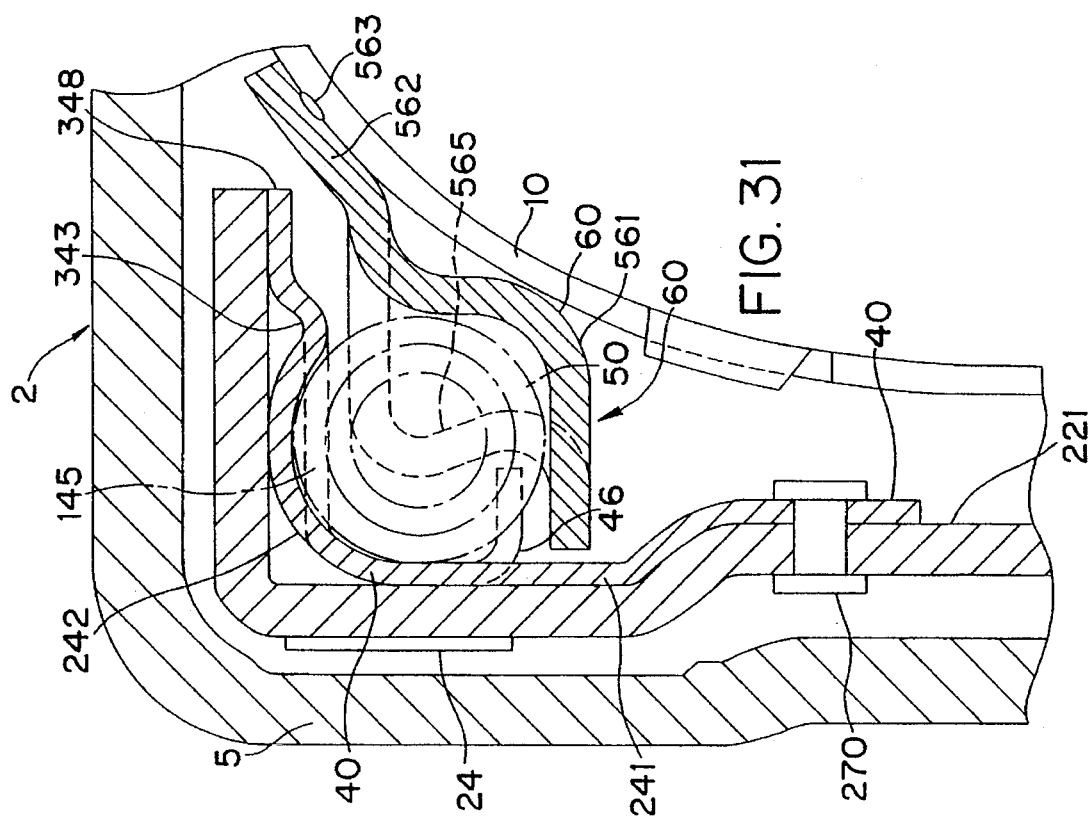

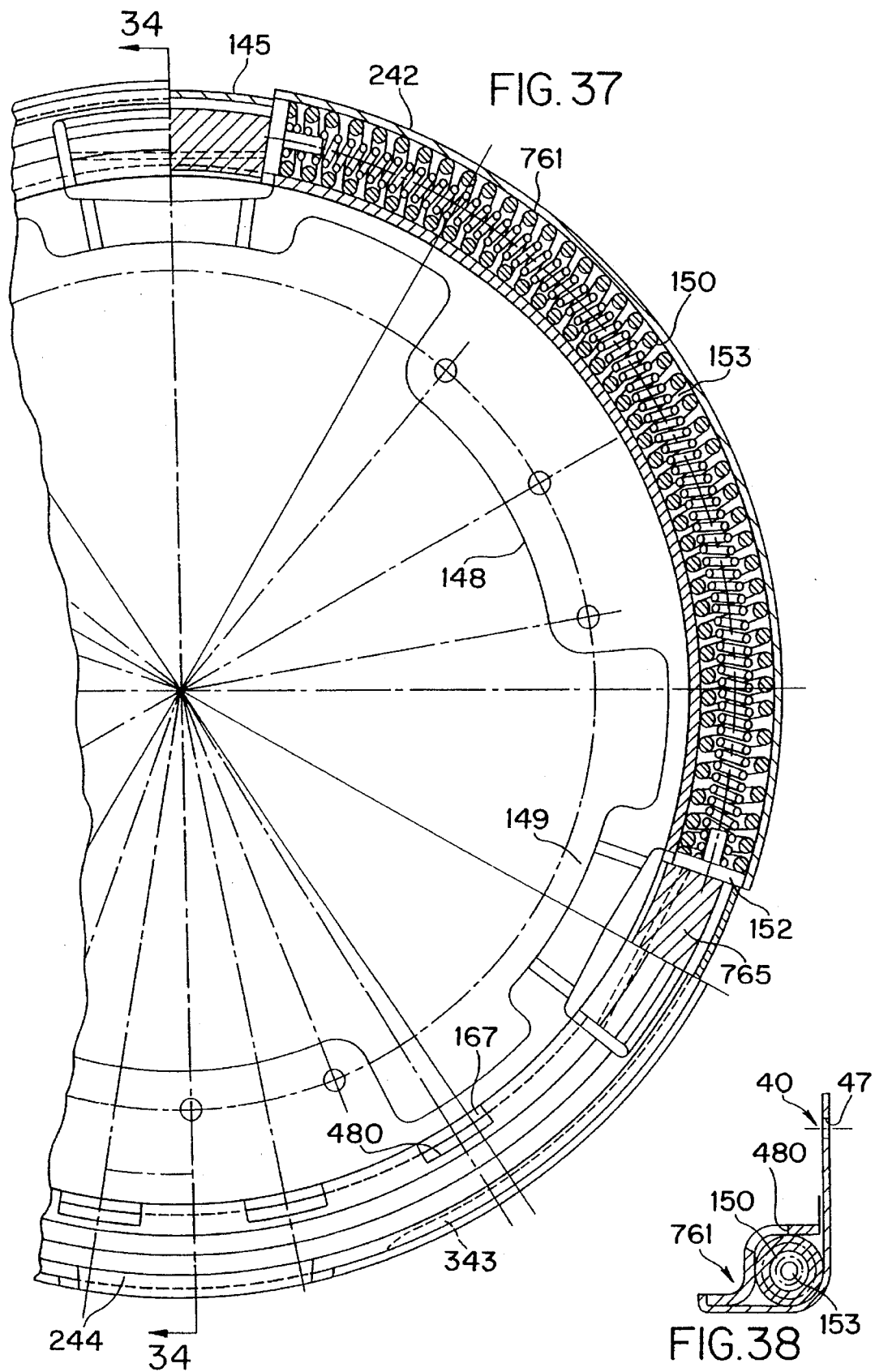

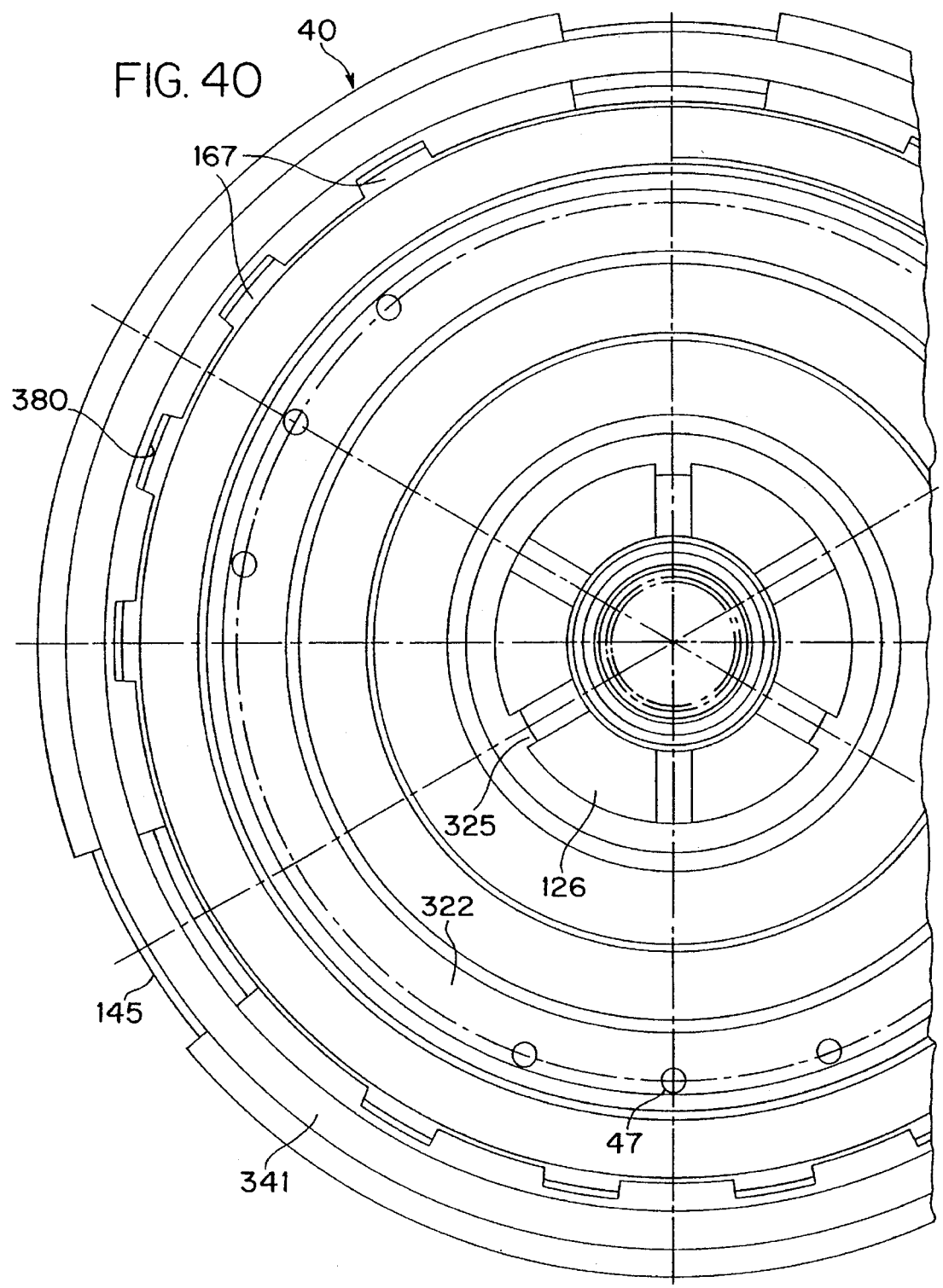

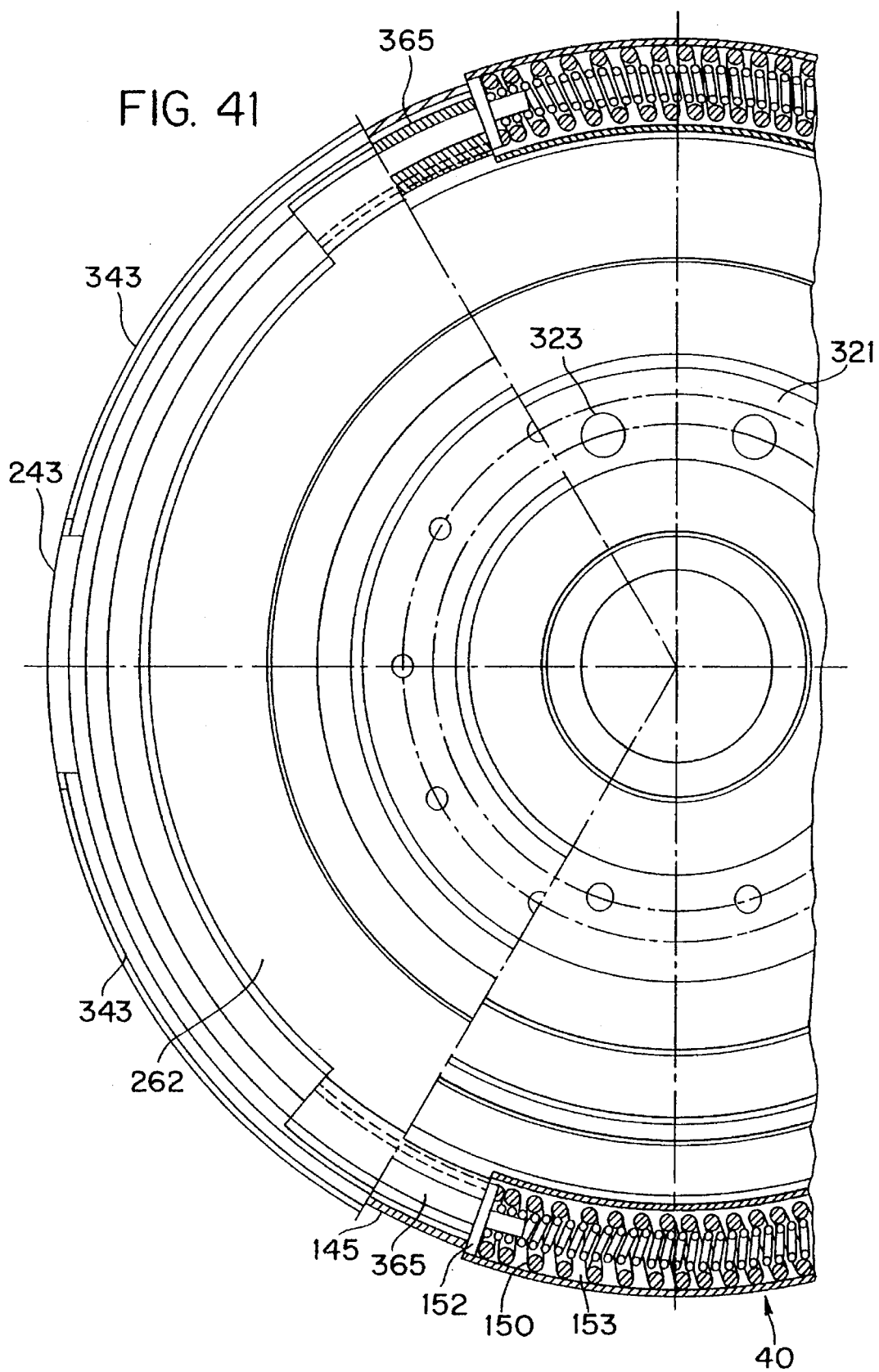

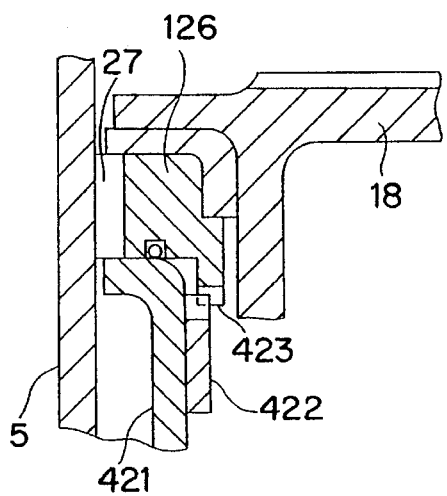
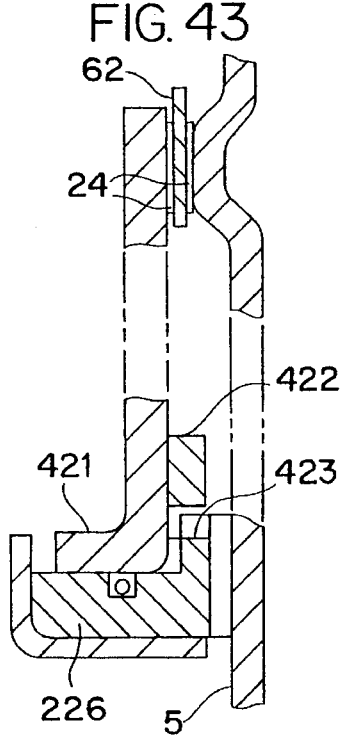
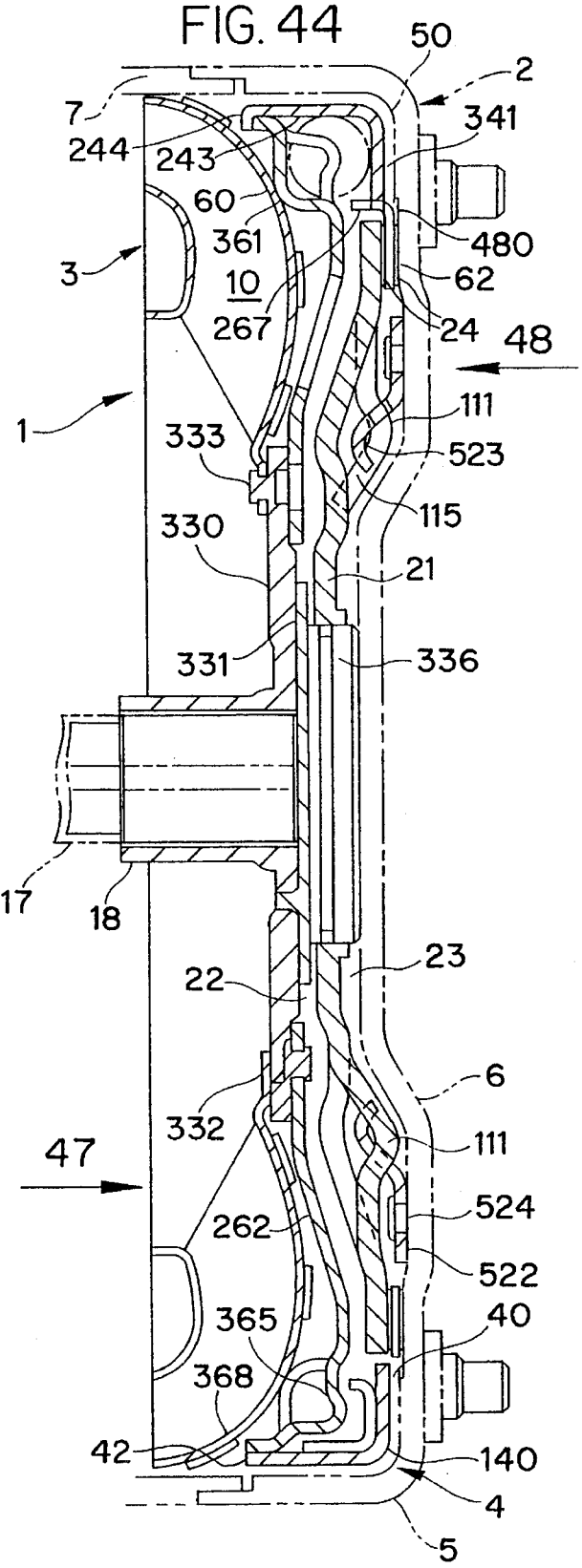

TORSION DAMPER FOR A LOCK-UP CLUTCH, AND A LOCK-UP CLUTCH HAVING SUCH A TORSION DAMPER

The present invention is concerned with torsion dampers for lock-up clutches adapted to work between a driving element and a driven element of a fluid coupling apparatus, especially for motor vehicles.

It is also concerned with lock-up clutches having such a torsion damper.

As is known, a clutch of the kind usually referred to as a lock-up clutch, for a fluid coupling apparatus acting between a driving element and a driven element, in particular for a motor vehicle, has a torsion damper, a piston mounted for axial movement with respect to the driven element, and at least one friction liner associated with the piston and adapted to be gripped between the piston and a counter piston.

The torsion damper has an input part, an output part, and springs interposed circumferentially between the input and output parts, for the purpose of coupling the latter together.

Such a clutch is described for example in the documents U.S. Pat. Nos. 4,875,562, and 5,119,911.

In the document U.S. Pat. No. 4,875,562, the piston is configured so as to form the input part of the torsion damper, and carries a friction liner which is arranged to make contact with a transverse wall of the housing of the fluid coupling apparatus, with the wall defining the counter piston.

The housing defines a casing and is adapted to be coupled to a driving shaft.

The output part of the damper is in fixed relationship with the turbine wheel of the fluid apparatus.

The turbine wheel is in fixed relationship with a hub which is adapted to be coupled to a driven shaft.

Thus the casing constitutes a driving element, while the hub of the turbine wheel constitutes a driven element, and the lock-up clutch is adapted to work between the casing and the turbine wheel.

In the document U.S. Pat. No. 4,875,562, the torsion damper comprises the piston retaining the springs (or resilient members) externally, together with a guide ring which is carried by the piston and which retains the springs internally by means of retaining lugs. The piston and the guide ring have abutment lugs for acting on the circumferential ends of the springs.

The input part thus comprises two components, while the output part comprises a damper plate which is in fixed relationship to the turbine wheel.

This damper plate has engagement lugs which penetrate between the circumferential ends of two consecutive springs so as to act on these latter.

Each of these lugs penetrates radially between two associated engagement lugs of the piston and guide ring respectively.

Functionally, the torsion damper is thus in three parts.

In a variant as shown in FIG. 6 of the document U.S. Pat. No. 4,875,562, the guide ring, being fixed with respect to the piston, retains the springs radially inwardly by means of retaining lugs, and radially outwardly by means of a flange, so that the torsion damper functionally comprises two parts, with a peripheral guide ring in the form of a half shell having a portion for retaining or supporting the springs, together with abutment portions for the springs.

However, the shape of the guide ring is complicated and it is difficult to make.

In addition, the space available for the springs is reduced, and fitting of these latter is not easy.

In addition, the springs are not well supported radially by the retaining lugs, which offer only a small abutment surface.

In order to overcome this drawback, consideration can be given to the adoption of a solution of the same type as that described in the document EP-A-0 358 318, in which the input part of the damper comprises two curved components, in facing relationship with each other and configured so as to retain the springs.

These components are disposed laterally on either side of the engagement lugs of the damper plate. As a result, the torsion damper is functionally in three parts, and the springs, especially when they are long, are not well retained radially when they are subjected to the action of centrifugal force.

An object of the present invention is to overcome these drawbacks and thereby to provide, in a simple and inexpensive way, a novel torsion damper having a reduced number of parts, while giving good support and good retention for the springs.

According to the invention a torsion damping device of the type described above, in which the damper plate has engagement portions for providing engagement with the springs, is characterised in that the damper plate has a retaining portion, for radially retaining the springs, being in the form of a half shell, in that the engagement portions of the damper plate are carried by the said retaining portion, and in that the retaining portions of the guide ring and of the damper plate are offset axially with respect to each other.

Thus thanks to the invention, the torsion damper functionally comprises only two parts, and the springs are well supported. In this connection, these springs are supported radially by the retaining portion of the guide ring and by the retaining portion of the damper plate. Under the action of centrifugal force, the springs will come into contact with the retaining portion of the guide ring.

The retaining portion of the damper plate enables some curvature to be given to the springs. The latter then work under excellent conditions, especially due to the fact that the damper plate and the guide ring define a profiled channel for the springs, which are confined between the damper plate and the guide ring. The damper plate may carry the guide ring or vice versa.

In addition, the guide ring is simplified because it no longer has any portion for the internal retention of the springs. This ring is therefore easier to make. In addition, the space available for the fitting of the springs is increased, due especially to the axial offset of the retaining portions of the damper plate and guide ring. Fitting of the springs is therefore easier, and the latter are under no risk of becoming damaged by contact with the guide ring or damper plate.

In addition, thanks to the invention, a large number of applications may be envisaged, and it becomes very easy to form a double-faced damper having two friction liners.

In this connection, the output part of the damper may comprise two elements, namely a support element for the springs (the damper plate proper), comprising the retaining portion and a disc which is movable axially with respect to the support element, being coupled in rotation to the latter, for example through a coupling of the tenon and mortice type.

In that case, the friction liners are disposed on either side of the disc. These liners can be gripped between a piston and a counter piston which is fixed to the driven element for rotation with it.

The piston may be mounted for axial movement with respect to the counter piston, being coupled to the latter for rotation with it. The said piston is for example mounted movably on a piston shaft which is fixed with respect to the counter piston, and the support element has an abutment which faces towards the counter piston so as to limit the displacement of the disc.

With this arrangement, a doubled-faced lock-up clutch is created, and when the lock-up clutch is disengaged, it is possible to be certain that the friction liners will be suitably released, that is to say that the latter will not foul the piston and the counter piston, the abutment being arranged accordingly.

It will be appreciated that it is possible to form a subassembly comprising the piston, the counter piston, the disc, and the friction liners, and that it is possible to fit the rest of the torsion damper blind on to the disc.

Preferably to this end, the piston shaft carries an abutment facing towards the counter piston, so as to limit the movement of the piston and for the building of the subassembly.

According to another feature, rotational coupling means, movable axially, work directly between the piston and the counter piston.

These means may consist of mating means, with the counter piston having for example protuberances which are engaged in recesses in the piston. The counter piston is stiffened by these latter.

In a modification, there may be tangential tongues acting between the piston and the counter piston.

In both cases, the rotational coupling means are fitted radially inwardly of the friction liners, in the vicinity of the latter.

These means are fitted on a circumference having a diameter greater than that of the piston shaft.

This arrangement ensures good release of the friction liners, and minimizes noise.

Good parallelism is then obtained between the piston and the counter piston.

The above mentioned support element, in the form of a half shell, is formed with slots in one embodiment.

The slots are then used to provide shoulders which define the above mentioned abutment.

These shoulders, facing towards the counter piston, may form one of the ends of the slots, or they may be formed on lugs projecting from the slots.

It is of course possible to reverse the structures, with the input part of the damper then comprising two elements, namely a support element for the springs, comprising the guide ring with its support portion, and the disc that is movable with respect to the support element, being coupled in rotation to the latter through a coupling which is for example of the tenon and mortice type.

These arrangements enable a novel lock-up clutch to be created.

In this connection, coupling means may work between the piston and a transverse wall of the casing, with the coupling means comprising a coupling member interposed axially between the piston and the transverse wall, the coupling member being in fixed relationship with the transverse wall of the casing. In that case, the piston is adapted to cause the friction liners and the above mentioned disc to be gripped between itself and the transverse wall of the casing.

In one embodiment, the coupling member has apertures in which pins projecting from the piston are engaged.

It becomes possible to improve these coupling means, especially with a view to simplifying manufacture of the fluid coupling apparatus.

In certain cases, it may be desirable to stiffen the damper plate even more, especially so that an increased torque can be transmitted.

In this connection, in this document the engagement portions of the damper plate are defined by lugs projecting from the retaining portion and formed by pressing and bending.

According to one feature, a torsion damper of the type described above is characterised in that engagement portions of the damper plate are formed in abutment knee portions of sinuous shape, extending from the inner periphery to the outer periphery of the retaining portion of the damper plate.

According to one feature, a lock-up clutch fitted between the casing and the turbine wheel of the fluid coupling apparatus is characterised in that it comprises a torsion damper having engagement knee portions.

Thanks to these arrangements, the resilient members are enabled to cooperate with the side of the knee portions in such a way that the damper plate enables an increased torque to be transmitted, and is accordingly stronger. It is also more stable in operation.

In addition, the knee portions offer an increased engagement surface to the resilient members. Due to this arrangement, the resilient members may comprise a plurality of stages, some of them being fitted with a circumferential clearance between two engagement knee portions of the damper plate.

The knee portions also enable thrust inserts for the resilient members to be fitted. In a modification, this arrangement enables concentric resilient members to be fitted.

It can also be relevant from the manufacturing point of view to provide a unitary assembly which cannot be lost but which can be handled and transported, comprising the torsion damper, the turbine wheel and the piston associated with the torsion damper, or an assembly comprising the torsion damper, the piston and the shell member of the casing to which the guide ring is accordingly connected. In a modification, the sub-assembly may comprise only the torsion damper with its associated piston.

In general terms, it is desirable to provide a unitary assembly comprising at least the torsion damper.

Thus, according to one feature of the invention the guide ring is provided at its outer periphery with a plurality of clips or lugs for snap-fitting, for cooperation with the edge of the outer periphery of the damper plate and for the retention of the latter.

Thus, after the resilient members have been fitted, the damper plate is snao-fitted on the guide ring, and the sub-assembly can be formed in a first production unit and finally assembled later, either to the turbine wheel or to its hub, or to the casing, in another production unit.

Preferably, the support portion of the damper plate includes a rounded zone at its outer periphery in order to facilitate the snap-fitting operation, with the rounded portion constituting a ramp means which enables the snap-fitting lugs to be easily spread.

By taking advantage of these lugs, which have a flange, it is then possible to interpose a friction ring between the damper plate and the flange. Similarly, it is possible to interpose a friction ring between an extension of the damper plate and the piston, in order to provide, both simply and inexpensively, friction effects within the lock-up clutch. It is of course possible to lock the lugs by upsetting of their material in place of snap-fitting.

In accordance with a further feature, the retaining portion of the guide ring is provided with at least one bead for the retention and positioning of the resilient members.

Thus, the resilient members are very well retained, and run no risk of being lost during the fitting of the torsion damper into the fluid coupling apparatus.

After the torsion damper has been fitted in the apparatus, the resilient members are well positioned and operate under excellent conditions.

The guide ring may be provided with mortices at its inner periphery, for example in the form of windows, for cooperation with tenons of a disc which is part of the clutch itself.

Thus the input part of the damper comprises two pieces, namely the guide ring and the disc, and a double-faced lock-up clutch can easily and simply be made.

The description that follows illustrates the invention with reference to the attached drawings, in which:

FIG. 6 is a view in elevation of the support element in accordance with the invention;

FIG. 7 is a view in cross section taken on the line 7—7 in FIG. 6;

FIGS. 8 and 9 are views on a larger scale of the parts ringed at 8 and 9 in FIG. 7;

FIGS. 18 to 21 are views similar to FIGS. 3 to 4, but showing further embodiments;

FIG. 25 is a view, shown partly cut away, seen in the direction of the arrow 25 in FIG. 22;

FIG. 26 is a view seen in the direction of the arrow 26 in FIG. 22;

FIGS. 31 and 32 are partial views similar to FIG. 24 but showing further embodiments;

FIG. 37 is a view, shown partly cut away, in the direction of the arrow 37 in FIG. 33;

FIG. 38 is a view in cross section taken on the line 34—34 in FIG. 37, showing the lower part of this cross section on a reduced scale;

FIG. 40 is a view in the direction of the arrow 40 in FIG. 39;

FIG. 41 is a view in the direction of the arrow 41 in FIG. 39, partly cut away locally so as to show the piston;

FIG. 42 is a partial view in cross section showing the loose coupling means interposed between the piston and a thrust ring;

FIG. 43 is a partial view similar to 42, showing yet a further embodiment;

FIG. 44 is a partial view in axial cross section, of a fluid coupling apparatus in accordance with the invention;

Figure 1:
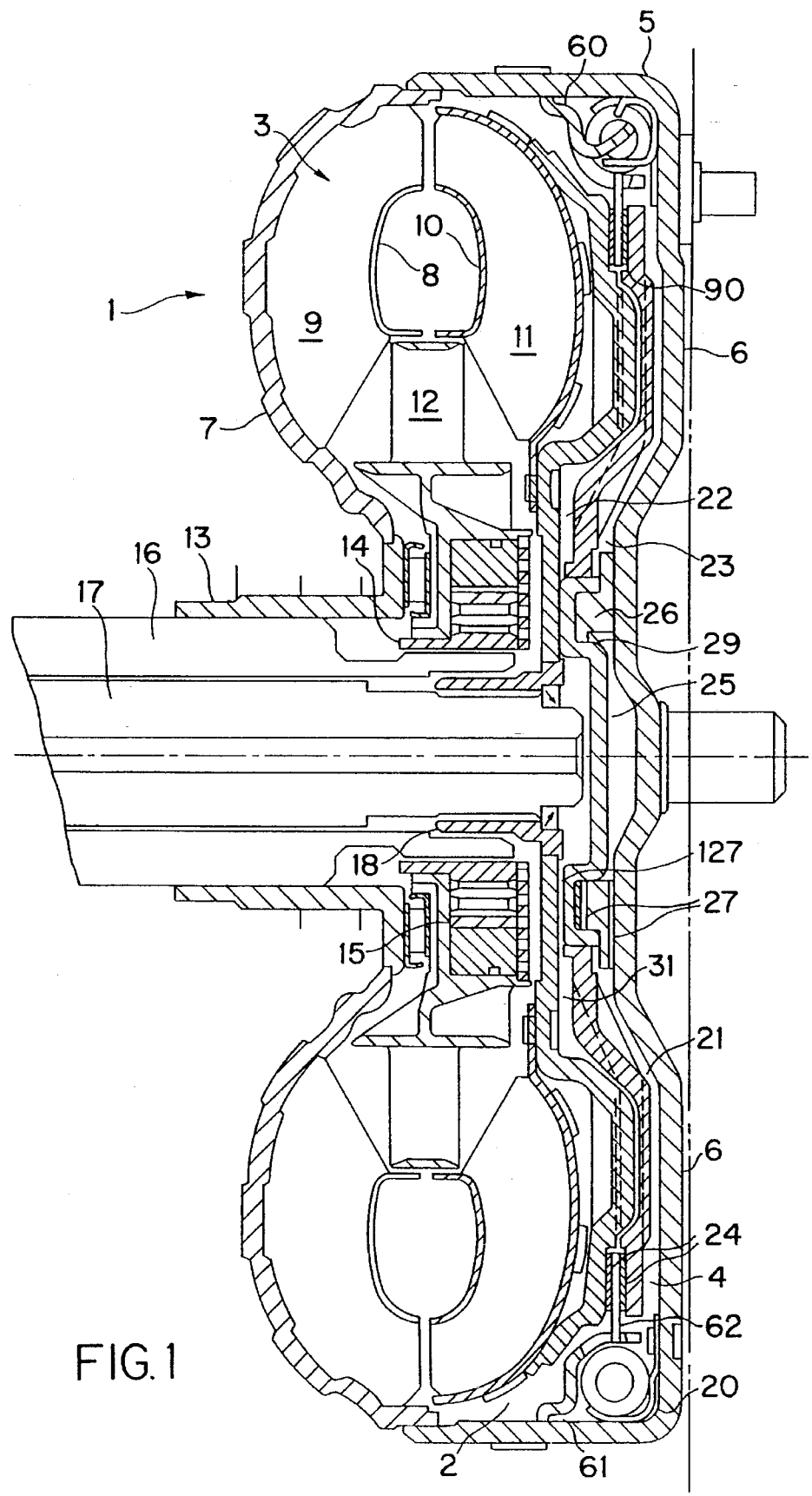
FIG. 1 is a view in axial cross section of a fluid apparatus having the lock-up clutch in accordance with the invention.

In the drawings, the lock-up clutch 4 is arranged in a fluid coupling apparatus 1. This apparatus 1 (FIG. 1) includes a torque converter 3 and a lock-up clutch 4, arranged in a common sealed housing 2 defining an oil casing.

The casing 2 is a driving element and is arranged to be coupled in rotation to the crankshaft of the internal combustion engine of the motor vehicle. The casing 2 is annular and comprises a first shell member 5 having an annular transverse wall 6, and a second shell member 7 which is in facing relationship with the first shell member 5, and which is so shaped as to define an impulse wheel 8 having blades 9. The blades 9 of this wheel 8 are fixed with respect to the internal face of the shell member 7. The shell members 5 and 7 are joined together, in this example by welding, sealingly at their outer periphery, while the wall 5 carries a centring element in its centre, and at its periphery threaded portions for coupling it to the crankshaft for rotation with the latter.

The remainder of the torque converter comprises a turbine wheel 10 having blades 11 which are in facing relationship with the blades 9, together with a reaction wheel 12.

The said turbine wheel 10 is coupled in rotation to a driven shaft 17, and in this example it is fixed to a central hub 18 which is coupled to the driven shaft 17, while the reaction wheel 12 is connected to a sleeve 14, with a free wheel 15 interposed. The sleeve 14 is fixed in relation to a fixed shaft (or reaction sleeve) 16, for rotation with the latter, by means of a splined coupling.

The shaft 16 is hollow coaxially for accommodating within it the internal driven shaft 17, which is itself formed with a coaxial bore, provided in this case for flow of oil through it. The shaft 17 is secured in rotation, by means of a splined coupling, to the hub 18, which has an internal splined bore for this purpose.

The hub 18 is a driven element, and is part of the lock-up clutch 4, defining the output element of the latter. The shell member 7 has a sleeve 13 which is screwed on to the sleeve 16. The clutch 4 is arranged between the wall 6 and the turbine wheel 10.

The clutch 4 includes a torsion damper 20, a piston 21 which is mounted for movement with respect to the driven element 18, and at least one friction liner 24 which is associated with the piston 21 and which is adapted to be gripped between the piston 21 and a counter piston 31, 5 which is in the form of a component that is fixed with respect to the turbine wheel 10 (FIGS. 1 to 21, FIG. 34), or a component which is fixed with respect to the shell member 5 (FIGS. 21 to 30, 35 to 41), or the annular wall 6 of the first shell member 5 (FIGS. 31, 32, 42, 43, 44).

The torsion damper 20 comprises an input part 40, an output part 60, and springs 50 which are interposed circumferentially between the input part 40 and output part 60, so as to couple these latter together. The damper is fitted at the outer periphery of the housing 2.

More precisely, the torsion damper 20 comprises two coaxial parts 40, 60, which are mounted for movement of one with respect to the other against the action of circumferentially acting springs 50, namely an input part comprising a guide ring 40, together with an output part comprising a damper plate 60. The guide ring includes a retaining portion 41, 42 . . . in the form of a half shell, together with engagement portions 45, 145 . . . , for the purpose of, respectively, retaining the springs 50 (externally in this example), and providing abutment for the springs, while the damper plate also includes engagement portions, 65, 165, for engagement with the springs 50. The guide ring 40 surrounds at least the greater part of the damper plate 60.

According to the invention, a torsion damper of the type described above is characterised in that the damper plate 60 includes a retaining portion 61, 161, 261 . . . in the form of a half shell, for the purpose of retaining the springs radially, in that the engagement portions 65, 165 of the damper plate 60 are carried by the above mentioned retaining portion of the damper plate, and in that the retaining portions 42, 142 . . . —61, 161, 261 . . . of the guide ring 40 and damper plate 60 are offset axially from each other. More precisely, in all of the drawings, fluid chambers 22, 23 are defined on either side of the piston 21.

It will be recalled that in every case, the turbine wheel 10 is driven by the impulse wheel 8, by virtue of the flow of fluid contained in the housing 2, and that after the vehicle has started, the lock-up clutch 4 couples the driven shaft and driving shaft solidly together so as to avoid any sliding effects between the wheels 8, 10; in other words the driving element 2 is frictionally coupled in rotation to the driven element 18.

In this connection, when, under the influence of hydraulic control pressure, the piston 21 grips the friction liner 24 between itself and the counter piston 31. The resulting locking effect causes the driven shaft 17, for example the input shaft of the gearbox, to be driven directly by the casing 2 which is coupled in rotation to the crankshaft of the engine.

In accordance with one feature, a lock-up clutch of the type described above is characterised in that the input part 40 of the torsion damper 20 is arranged to be fixed with respect to the driving element 2, in that the output part 60 of the damper comprises two elements, namely an element 61 (which is the damper plate proper) for supporting the springs 50 and including the retaining portion, and a disc 22 which is movable axially with respect to the support element 61 and which is coupled in rotation to the latter, in that friction liners 24 are fitted on either side of the disc 62, in that the friction lines 24 are arranged to be gripped between the piston 21 and the counter piston 31 that is fixed to the driven element 18 for rotation with the latter, in that the piston 21 is mounted for axial movement with respect to the counter piston 31, but is coupled for rotation with the latter, in that the piston 21 is mounted for movement on a piston shaft 25 which is fixed to the counter piston 31, and in that the support element 61 has an abutment element 67, facing towards the counter piston 31, so as to limit the displacement of the disc 62.

Figure 2:
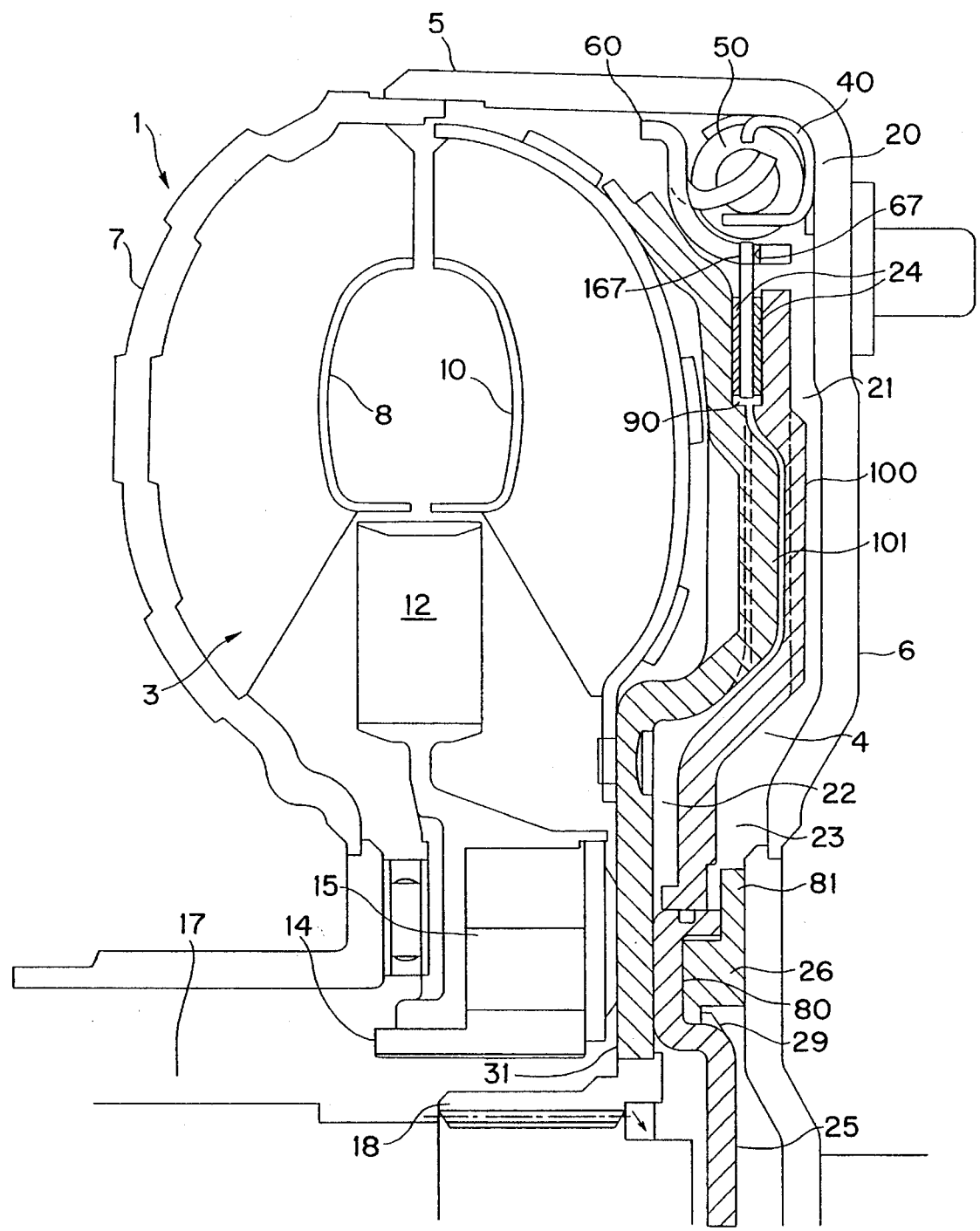
FIG. 2 is a half view on a larger scale of the fluid apparatus of FIG. 1.

In FIGS. 1 and 2, the friction liners 24 are adhesively secured on the disc 62, on either side of the latter. These liners are accommodated in a cavity 90 which is delimited by the piston 21 and the counter piston 31. This cavity 90 is formed at the outer periphery of the piston 21 and has two parallel transverse faces, formed respectively on the piston 21 and the counter piston 31, for contact with the friction liners 24. The disc 62, with its liners 24, extends into the interior of the cavity 90, which is open radially outwardly towards the outer periphery of the shell member 5 (the axial flange of the latter).

In a modification, the liners 24 may be adhesively secured respectively on the piston 21 and on the counter piston 31, with the disc 62 being interposed between these latter.

The counter piston 31 is formed with embossed portions 101 which are adapted to cooperate with complementary recesses 100 formed in the piston 21. The embossed portions 101 and recesses 100 are arranged close to the friction liners 24, but radially inwardly of the latter, and are disposed on a mean pitch circle having a diameter greater than that of the piston shaft 25.

This arrangement leads to a reduction in the relative circumferential movement of the piston 21 with respect to the counter piston 31, and in the noise resulting from that movement.

In this connection, the embossed portions 101 extend into the recesses 100 with a clearance such that, when this coupling is effected radially further inwardly, the circumferential displacement of the piston 21 with respect to the counter piston 31 is increased, so that noise is also increased.

Thus the piston 21 is mounted for axial movement with respect to the counter piston 31, being coupled to the latter in rotation by the mating cooperation.

In this example, three embossed portions 101 and three recesses 100 are provided, spaced apart at regular intervals on the circle. More precisely, the embossed portions 101 and the recesses 100 are made by press forming or by partial shearing of the material, the piston 21 and counter piston 31 being of sheet metal. The material is press formed (or sheared) with a tool, without going the whole way.

Figure 12:
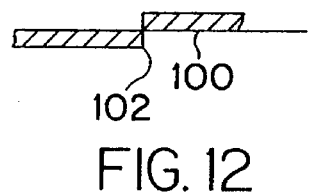
FIG. 12 is a partial view in cross section taken on the line 12—12 in FIG. 10.
Figure 13:
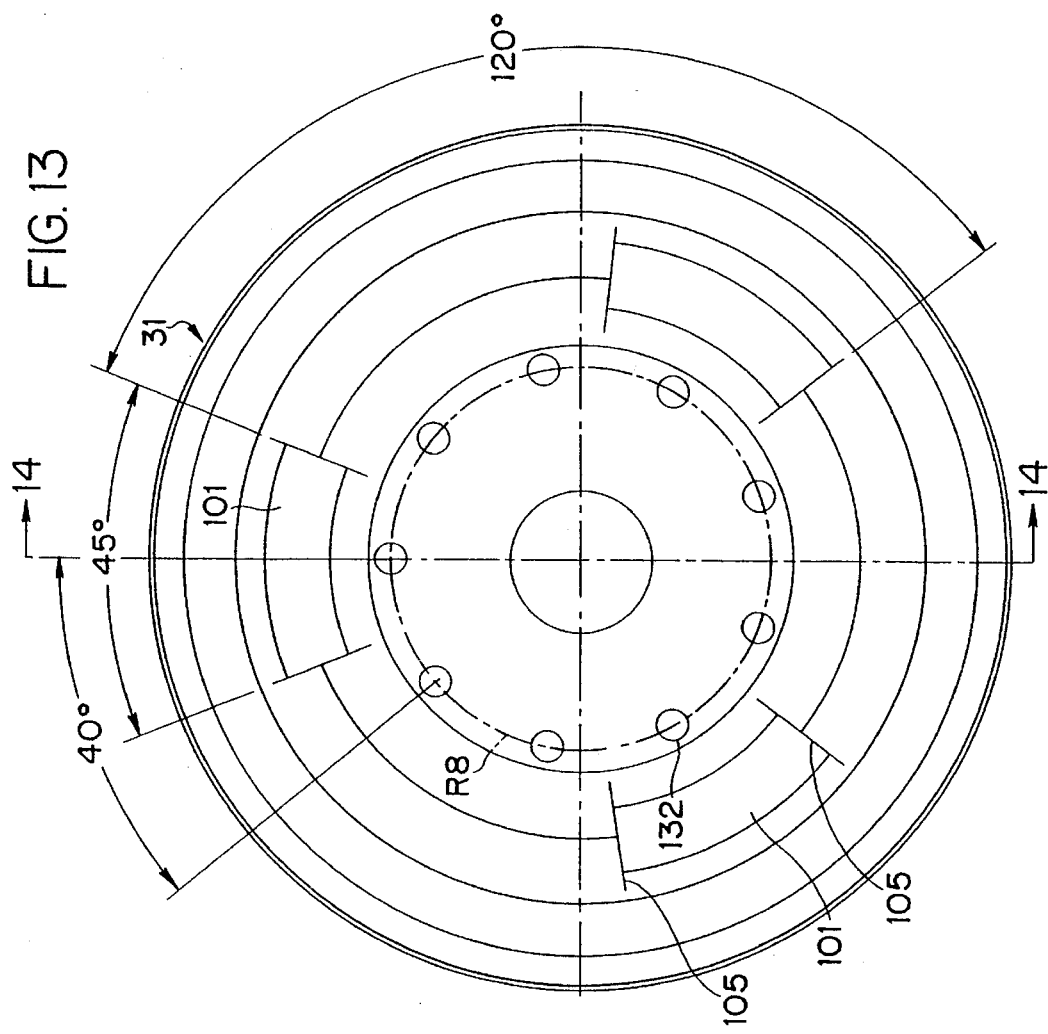
FIG. 13 is a view in elevation of the counter piston in accordance with the invention.
Figure 14:
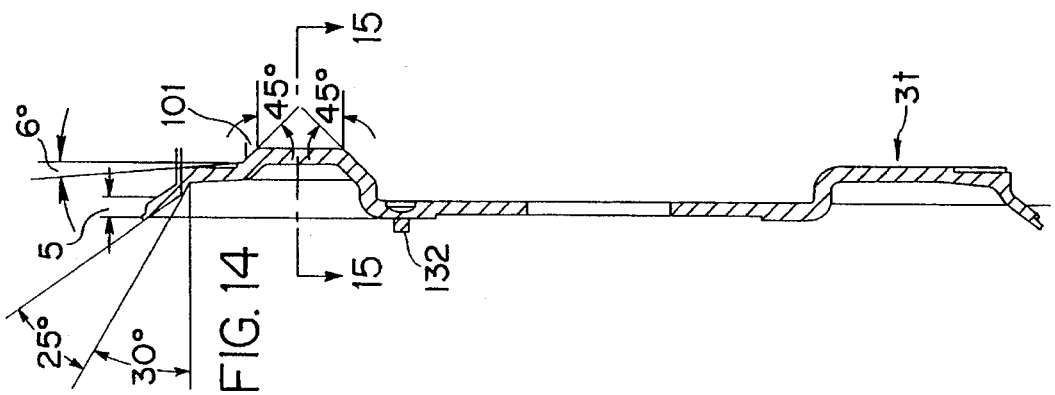
FIG. 14 is a view in cross section taken on the line 14—14 in FIG. 13.
Figure 15:
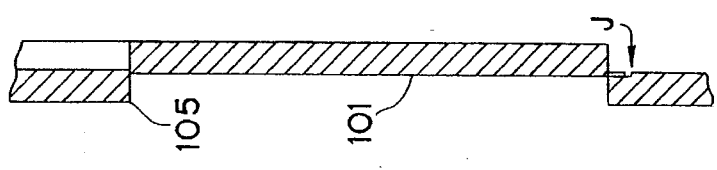
FIG. 15 is a partial view in cross section taken on the line 15—15 in FIG. 14.
Figure 16:
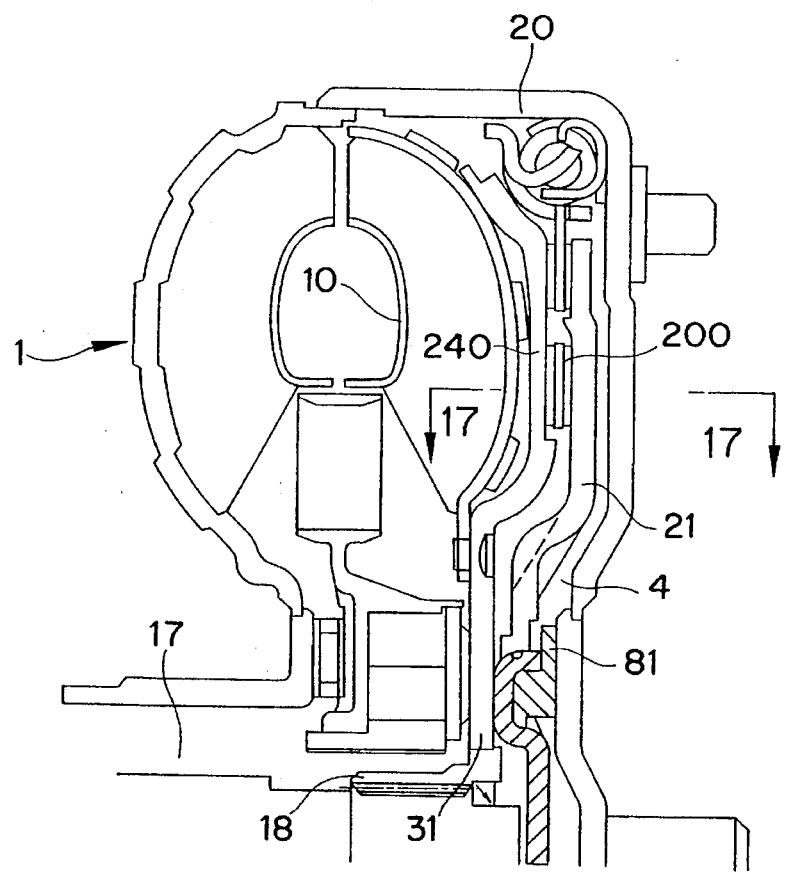
FIG. 16 is a half view, similar to FIG. 2 but showing another embodiment.
Figure 17:
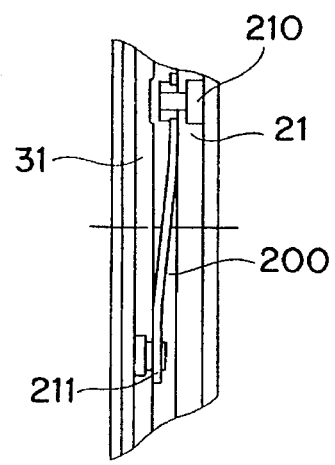
FIG. 17 is a view in partial cross section taken on the line 17—17 in FIG. 5 [sic]

Thus in FIGS. 12 and 13, the thickness of material remaining after press forming is indicated at J. This residual material enables the thickness of the piston 21 and counter piston 31 to be retained. In addition, the press forming operation causes the material to be forced outwardly so as to create embossed portions. Thus, the embossed portion 101 enters into the associated recess 100, and the piston 21 is then machined after the recess 100, and therefore in consequence an embossed portion, has been formed, so that this embossed portion does not come into contact with the wall 6. This machining operation consists in raising material which can be seen at 104 (FIG. 11), with the base of the recess 100 being very thin. In this way the axial size of the lock-up clutch is reduced.

It will be appreciated that the tool employed, and the partial pressing out operation, lead to the formation of parallel straight edges 102, 105 (FIGS. 10 to 15) which delimit circumferentially the embossed portions 101 and recesses 100 respectively. During the axial movement of the piston 21 with respect to the counter piston 31, the edges 105 slide along the edges 102, with a small fitting clearance. This sliding movement is performed with some precision due to the good geometric precision of the edges 102, 105, the embossed portions 101 and recesses 100 having, in cross section, a trapezoidal shape complementary with the rounded portions.

It will be appreciated that the embossed portions 101, constituting protuberances, stiffen the counter piston 31. Similarly, the formation of the recesses 100 by partial press forming leads to the formation of embossed portions and to stiffening of the piston 21. The counter piston 31 is secured at its outer periphery, in this example by welding, to the turbine wheel 10.

At its inner periphery, the counter piston 31 is secured by riveting, or in a modification by welding, to the wheel 10. To this end, the rivets 132 are made by local press forming in the counter piston 31. They are located on a pitch circle having a radius R8 inwardly of the embossed portions 101 (FIG. 13).

The counter piston 31 is secured at its inner periphery to the hub 18 (the driven element), here by deformation of the material or, in a modification, by welding.

The piston 21 is mounted for axial movement on the piston shaft 25. This shaft 25 has a peripheral flange 80 of channel shape, in which a thrust ring 26 can be fitted. This ring 26 is arranged to make contact with the wall 6 and has a peripheral radial outer flange 81 which limits the displacement of the piston 21 in order to prevent any contact between the wall 6 and the piston 21. The flange 81 projects radially from the shaft 25.

A sealing gasket is arranged between the internal bore of the piston 21 and the outer periphery of the piston shaft 25.

The ring 26 has on each of its faces grooves 27 through which fluid can flow between the fluid chambers 22, 23. Similarly, the shaft 25 has communication grooves 125 on that one of its faces which is directed towards the counter piston 31, so as to give access to the chamber 22. These grooves 127 are formed in the peripheral flange 80.

It will be noted that there is a radial clearance between the outer periphery of the ring 26 and the channel 80 of the shaft 25. The ring 26 constitutes a friction ring, in this example of aluminium, being deformed at 29 over the piston shaft 25. The ring 26 has two functions, namely a function as a strut in the direction of the thickness, and a thrust element function.

It is thus possible to build a sub-assembly consisting of the counter piston 31 and turbine wheel 10, then to fit the clutch disc 62, carrying its friction liners 24, subsequently to fit the piston and piston shaft, then to deform the thrust ring 26 over the shaft 25 (at 29), and to weld the shaft 25 on to the counter piston 31, here by laser welding. The input part of the damper 20 is fitted independently on the shell member 5, the springs 50 are fitted, followed by the support element 61, and finally the sub-assembly consisting of the damper 20 and shell member 5 is fitted blind on the disc 62, so that the shell member 5 covers the shell member 7.

It will be appreciated that the flange 81, arranged axially between the wall 6 and the channel 80, so as to project radially with respect to the latter, limits the displacement of the piston 21 before the wall 6, carrying the greater part of the damper 20, is fitted.

In this way there is created a sub-assembly which is capable of being handled and transported, and which comprises the piston 21, the counter piston 31, and the disc 62, and the remainder of the damper 20 can be fitted blind on to the disc 62.

More precisely, the input part of the damper comprises a guide ring 40, in this example a single ring, having a transverse portion 41 in which holes 47 are formed in local embossed portions 48 which are offset axially towards the wall 6 for contact with the latter (FIG. 5), so as to be fastened by riveting on the wall 6. To this end, the wall 6 is deformed locally so as to form rivets 70 which are integral with the wall 6. Fastening by riveting is then carried out sealingly, with the holes 47 being threaded over the rivets 70, the latter being in the form of pegs before being deformed.

The wall 41 is extended in an annular wall 42 which surrounds and envelops the springs 50, which are long. The wall 42 has in cross section a curved portion in the form of an arc of a circle, together with an axially orientated portion. The wall 42 hugs the inner periphery of the shell member 5, and is directed towards the wheel 10 and it has a bent back free edge 43.

As a result of this, the springs (or resilient members) 50 are retained and held axially and radially outwards by the guide ring 40, which in this example is of press formed metal plate and which is accordingly in the form of an annular half shell, with the springs bearing locally on the wall 41 and on the axial portion of the wall 42 (FIGS. 1 to 4).

Accordingly, the guide ring 40 has a support and retaining portion 41, 42 for the springs 50, together with engagement portions 45, 46, which in this example are in the form of lugs to be described below, for engagement with the springs 50.

More precisely, the wall 42 is interrupted locally between the two circumferential ends of two consecutive springs 50, so as to form, by a pressing and bending operation, engagement lugs 45 which extend radially inwardly so as to bear circumferentially on the ends of the springs 50. Similarly, the wall 41 is interrupted locally between two consecutive springs 50 so as to form, by pressing and bending, axial engagement lugs 46 which are engaged axially with the ends of the springs 50. The lugs 45, 46 are in facing relationship with each other (FIG. 5).

The springs 50 are therefore in circumferential engagement externally on the lugs 45 and internally on the lugs 46, so that the circumferential ends of the springs 50 are firmly retained.

Figure 5:
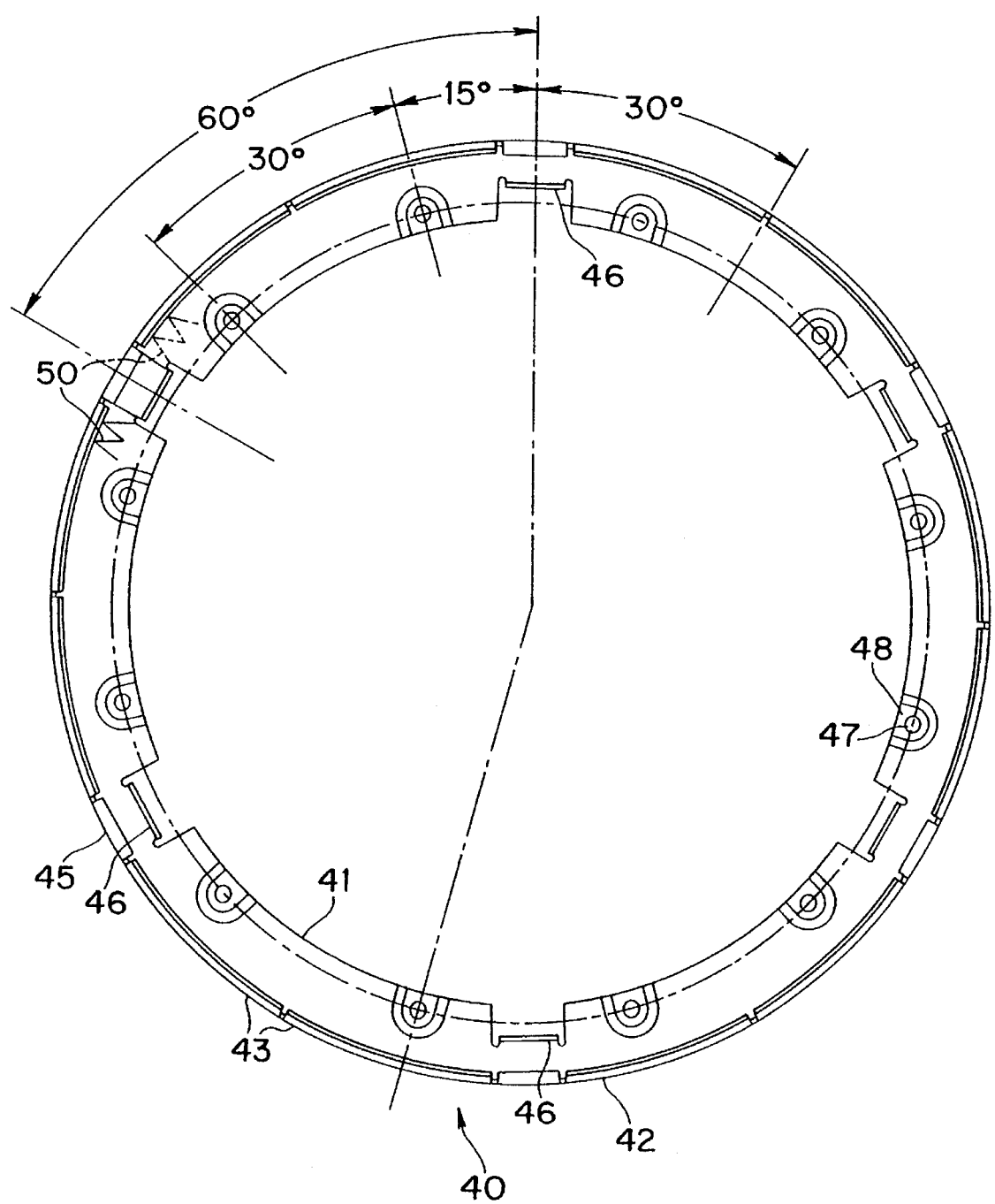
FIG. 5 is a view in elevation of the input element of the torsion damper.
Figure 10A:
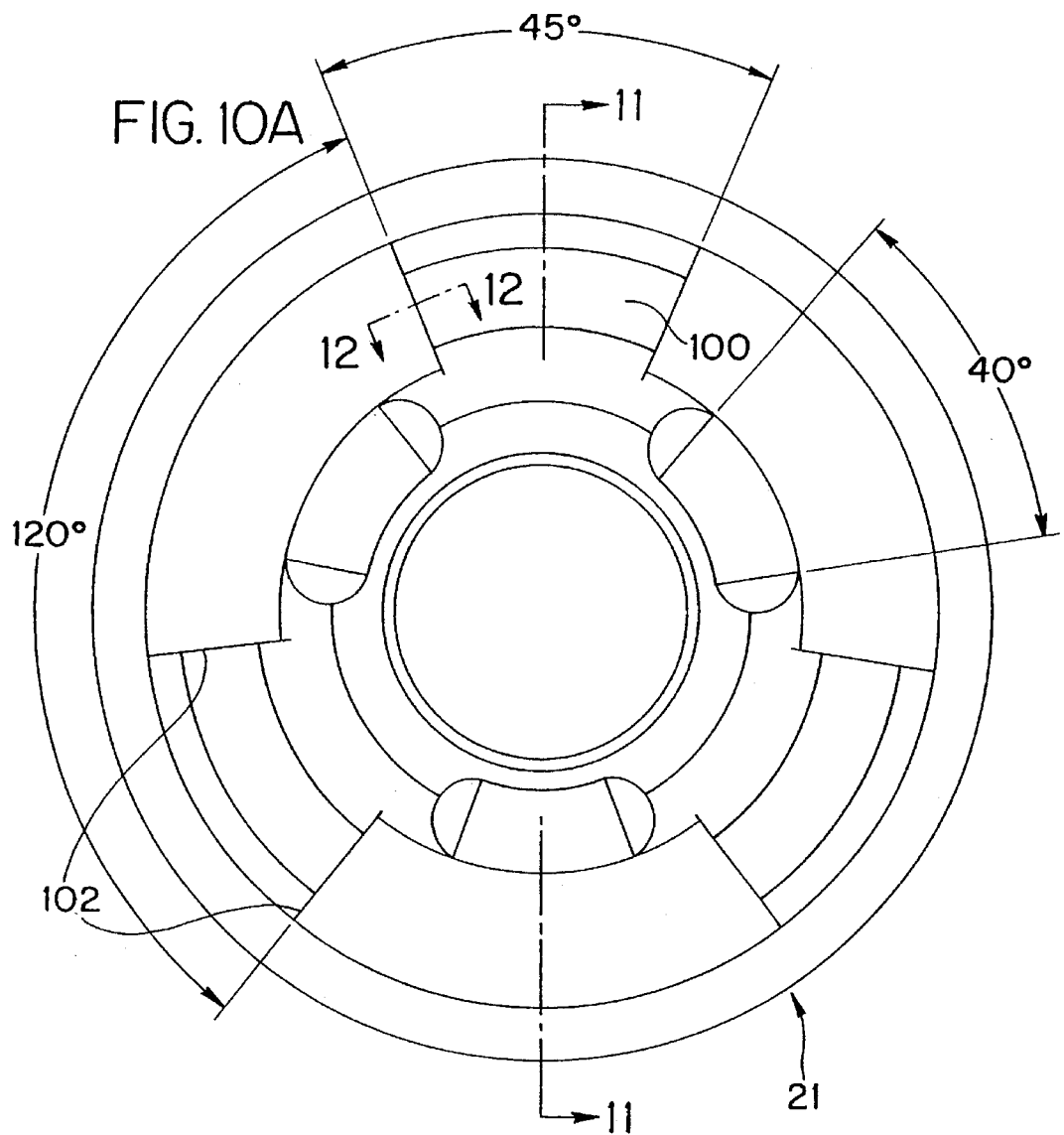
FIG. 10 is a view in elevation of the piston in accordance with the invention.
Figure 10B:
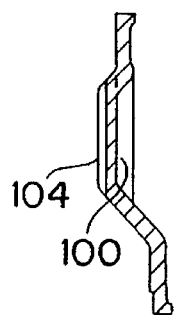
Figure 11:
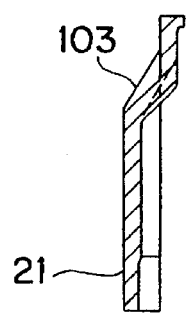
FIG. 11 is a view in cross section taken on the line 11—11 in FIG. 10.

The circumferential ends of two consecutive springs are indicated partially in FIG. 5.

The output part 60 comprises a support element 61 which is in the form of a half shell, of press formed metal plate in this example. This shell member 61, which is of annular form with a circular cross section, has at its outer periphery an axially oriented stiffening flange 68, while at its inner periphery it has an axially oriented edge 66. The flange 68 is offset axially with respect to the wall 42, to define a slot.

The shell member 61 is interrupted locally by slots 64, and retains the springs 50 in a curved position radially inwardly.

More particularly, projecting engagement lugs 65 are formed by pressing out and bending of the shell member 61, with formation of a slot 64. This slot 64 is closed, and a radial shoulder 67, facing towards the counter piston 31, is formed at the axial end concerned of the slot 64 at the level of the junction zone between the curved portion of the component 61 with the flange 66.

The lug 65 is raised (FIG. 8), and is curved in shape. It enables the circumferential ends of the springs 50 to bear radially between the lugs 45, 46. The half shell 61 retains the springs 50 radially inwardly, and it is fitted by gripping of its lugs 65 between two springs 50. The springs 50 therefore follow the shape of the shell member 61, so that they are thus curved. Accordingly, the damper plate 60 has a support and retaining portion 61 for the springs 50, together with engagement portions 65 which in this example are in the form of lugs, for the springs. The engagement portions 65 are carried by the retaining portion.

It will be noted that the profiled curved portions—which are here arcuate—of the retaining portions of the guide ring 40 and of the damper plate 60 extend generally on either side of the radial axis of symmetry of the springs (see FIGS. 1 to 4). The same is true in FIGS. 18 to 24, 29, 34, 38, 41, 44 which will be described below, and also FIGS. 31, 32, in which the retaining portion is extended circumferentially beyond the radial axis.

The clutch disc 62 has at its outer periphery tenons 167 for engagement in a complementary manner in the slots 64 of the shell member 61.

Thus the transversely orientated clutch disc 62 is coupled in rotation to the retaining element 61, with axial mobility given by mating cooperation, the coupling being of the tenon and mortice type.

It will be realised that the curved shape of the shell member 61 enables the tenons or lugs 167 to engage in the slots 64, with the lugs 65 being directed towards the ring 40 and the wall 6.

In this example, six springs 50, arranged regularly on a circle, are provided, together with six pairs of lugs 45, 46 (FIG. 5) and six lugs 65 (FIG. 6).

An additional closed slot 64 defining a shoulder 67 and made by pressing (FIG. 9) without the formation of lugs 65, is provided between two consecutive lugs 65. This enables the number of tenons 167 to be increased, two of these being shown diagrammatically in FIG. 6. The number of tenons 167 is thereby doubled, in this example to twelve. This gives good driving of the clutch disc 62, and good torque transmission.

The slots 64 are delimited circumferentially by two parallel edges, and the press forming operation on the sheet metal, with or without formation of lugs 65, leads to the formation of an inclined shoulder 67 (FIGS. 8 and 9). This gives a high degree of geometric precision of the edges, and the point-contact shoulders 67 are accurately located.

It will be noted that the springs 50 are thus trapped between two half shells 40, 60, in facing relationship according to an axis of symmetry which is inclined with respect to the radial axis of symmetry of the springs 50, and thus defining a concavity since they face in opposite directions. The number of components in the damper is thus reduced, while giving good support to the springs which hug the shape of the half shells 40, 60, the ring 40 being disposed, at least mostly, radially outwardly of the element 60 in all of the Figures.

The retaining and support portions 61, 41–42 of the damper plate 60 and guide ring 40 are thus offset axially with respect to each other.

All of this facilitates assembly by the threading of one part of the damper, fixed to the casing 2, over the disc 62.

In operation, when the pressure that prevails in the chamber 23 is greater than the pressure prevailing in the chamber 22, the piston 21 comes into engagement with the liners 24 then gripped between itself and the counter piston 31, and the clutch is locked. By reversal of the pressures in the chambers 22, 23, the piston 21 can be released, that is to say the latter can be displaced towards the wall 6, so as to unlock the liners 24 and so release them. During the axial movement of the piston 21 towards the casing 6, movement of the liners 24 is limited by cooperation of the tenons 167 with the shoulders 67 which define the abutment in accordance with one feature of the invention.

Perfect operation of the lock-up clutch is obtained in this way, with good torque transmission between the disc 62 and the hub 18 due to the presence of the piston 21 and counter piston 31.

It will be noted that the grooves 27, 127 enable inversion of pressure to take place in the chambers 22, 23, and that the depth of the recesses 100 and embossed portions 101 depends on the retraction of the piston 21, so as to give permanent coupling in rotation between the piston 21 and the counter piston 31.

It will be appreciated that this arrangement enables the turbine wheel to be stiffened, and that the torsion damper is disposed mostly at the outer periphery of the shell member 5, radially outwardly of the piston 21 and in the space which is available here.

In this way, good parallelism can be obtained between the piston 21 and the counter piston 31, and also good release of the liners 24.

The rotational coupling between the piston 21 and counter piston 31 can of course be achieved by means of tangential tongues 200 (FIGS. 16 and 17), arranged radially inwardly of the disc 62 and close to the latter. To this end, the counter piston 31 has, in the region of the tongues 200, a reduced thickness which is made possible due to the fact that it is secured at its inner and outer peripheries to the turbine wheel 10. This arrangement reduces axial size.

In this case, one circumferential end of each tongue 200 is secured by riveting at 211 to the counter piston 31, with the rivets 211 being formed by local deformation of the counter piston 31.

The other circumferential end of the tongues 200 is secured to the piston 21 by means of bolts 210.

It is thus possible to build a sub-assembly consisting of the turbine wheel 10, counter piston 31, and hub 18, and then to fit the piston 21 on the latter, by securing the latter by means of the bolts 210 on the tongues 200, which are refitted on the counter piston 31.

The disc 62, with its friction liners 24, will of course have been previously fitted.

In a modification (FIGS. 18, 19 to 21), the piston shaft 125 can be secured by riveting on to the counter piston 131, instead of by welding.

The rivets 232 preferably secure the piston shaft 125 and the counter piston 131 together to the turbine wheel 10.

In that case, the thrust ring 126 is secured by means of rivets 129 on to the shaft 125 in advance, with the ring 126 having grooves 227 on both of its faces so as to permit flow of oil and pressure inversion in the chambers 22 and 23. The counter piston and piston shaft 125 are of course formed with pressed out portions in order to accommodate the heads of the rivets 129.

In this case, the piston 121 is coupled in rotation to the counter piston 131 indirectly through the shaft 125 and by mating cooperation.

More precisely, the inner periphery of the piston 121 has a tubular shape in which mortices 300 are formed, with the shaft 125 having complementary radially oriented tenons 301.

The shaft 125, by cooperation of the tenons 301 with the base of the mortices 300, thus limits movement of the piston 121, by preventing the latter from coming into contact with the wall 6 as before. The ring 126 thus has a thickening function, while the tenons 301 define abutments which face towards the counter piston 131 so as to limit the movement of the piston 121 and enable a subassembly to be constructed.

In the embodiment shown in FIG. 18 and 19, the lugs 165 of the half shell 161, for supporting and maintaining the curvature of the springs 50, are modified, and they extend generally axially, being arranged centrally with respect to the springs 50, which are thus firmly engaged on the lugs 165.

The presence of a radial flange 69, for stiffening the axial edge 166 that delimits the slot 164 axially, will also be noted.

Figure 20:
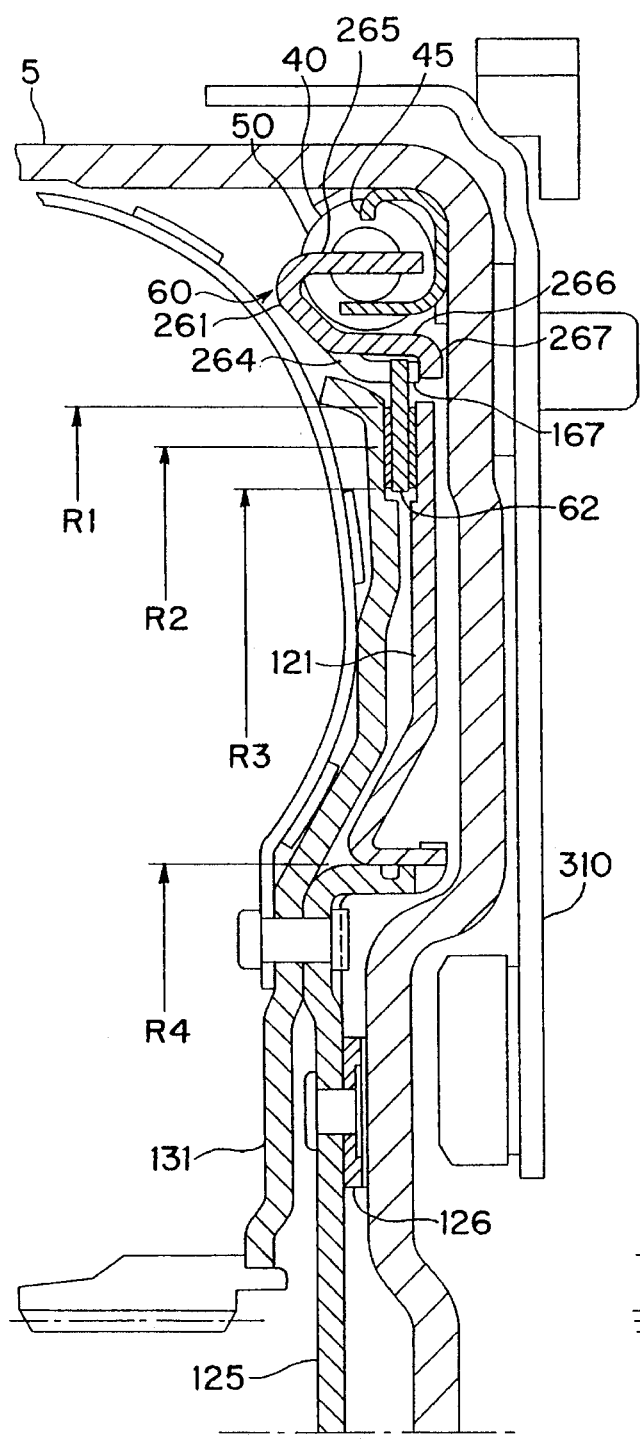
Figure 21:
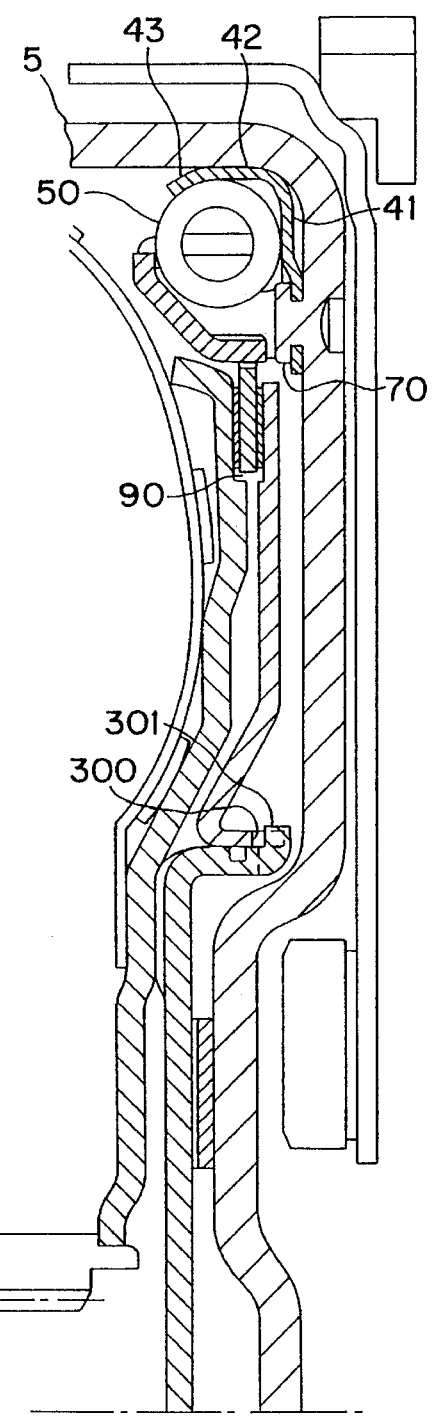

In FIGS. 20 and 21, the support element 261 is modified, and has a retaining part or portion in the form of a half shell, at the outer periphery of which there extend axially-oriented lugs 265 directed towards the wall 6. It is on these lugs 265 that the circumferential ends of the springs bear.

The slots 264 which are formed in the half shell 261 are open axially, and displacement of the disc 62 is limited by means of raised lugs 266 which are defined by the slots 264. The lugs 266 extend between the springs 50, as do the lugs 265, and are extended at their free ends by a radially oriented flange 267, which defines a shoulder for limiting the axial displacement of the disc 62, by cooperation of the tenons or lugs 167 of the latter with the flanges 267 which constitute the abutment facing towards the counter piston 131 in accordance with the invention.

It is of course possible to provide additional slots 264 for driving the tenons 167 in rotation. In FIGS. 18 to 21, it will be noted that there is a component 310 for securing the casing 2 on to the crankshaft, with this component carrying a starter crown 311.

As will be evident from the description and the drawings, coupling in rotation between the piston and the counter piston, directly (FIGS. 1 to 17) or indirectly through the piston shaft (FIGS. 18 to 21), takes place on a circumference having a diameter which is greater than that on which the piston shaft is secured to the counter piston.

All of this leads to good sliding movement of the piston, guided by the piston shaft which is fixed with respect to the counter piston.

The guide ring 40 may be divided, due to the fact that it is secured by riveting.

Figure 22:
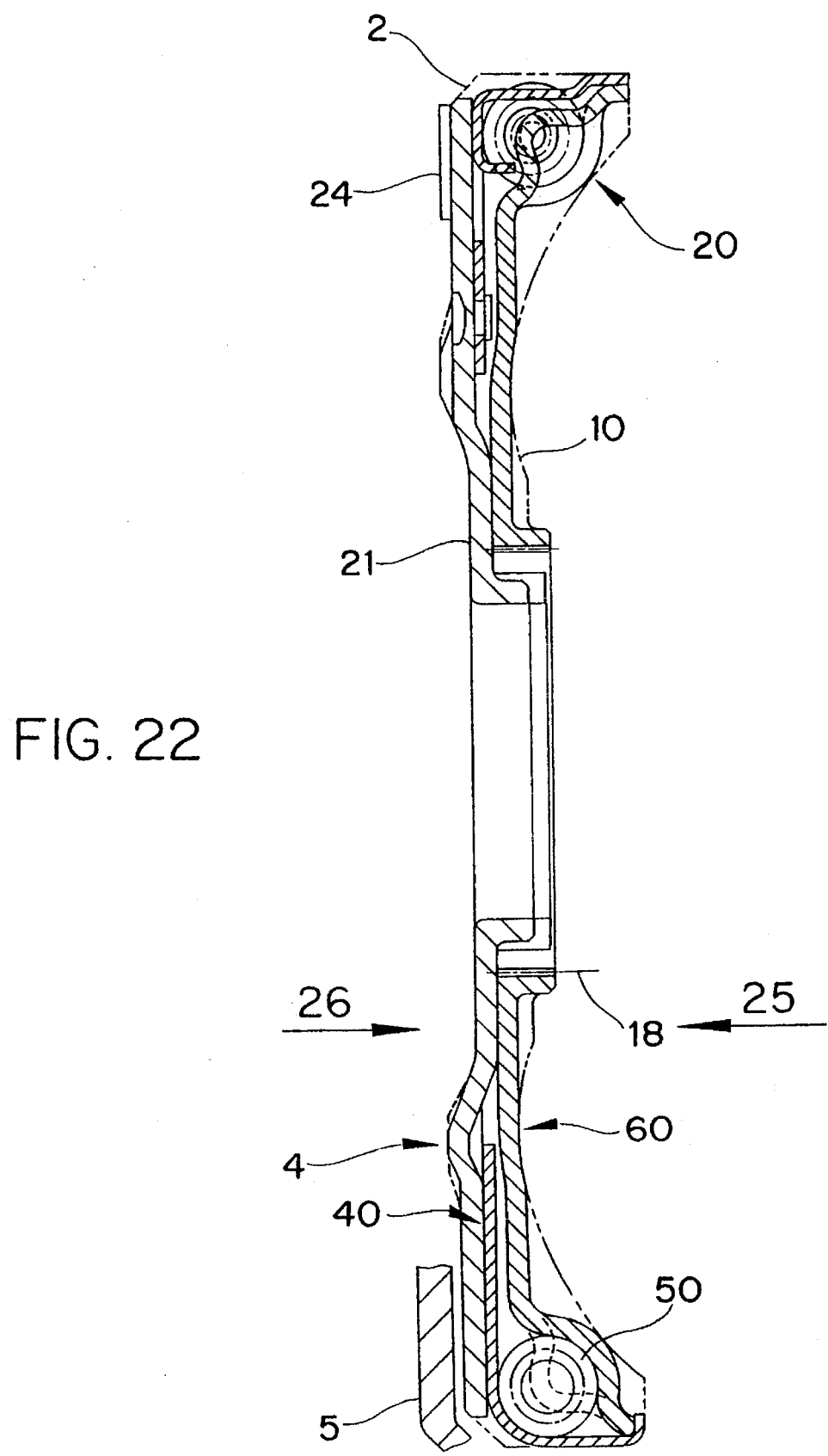
FIG. 22 is a view is cross section taken on the line 22—22 in FIG. 25, of the torsion damper in accordance with the invention.
Figure 23:
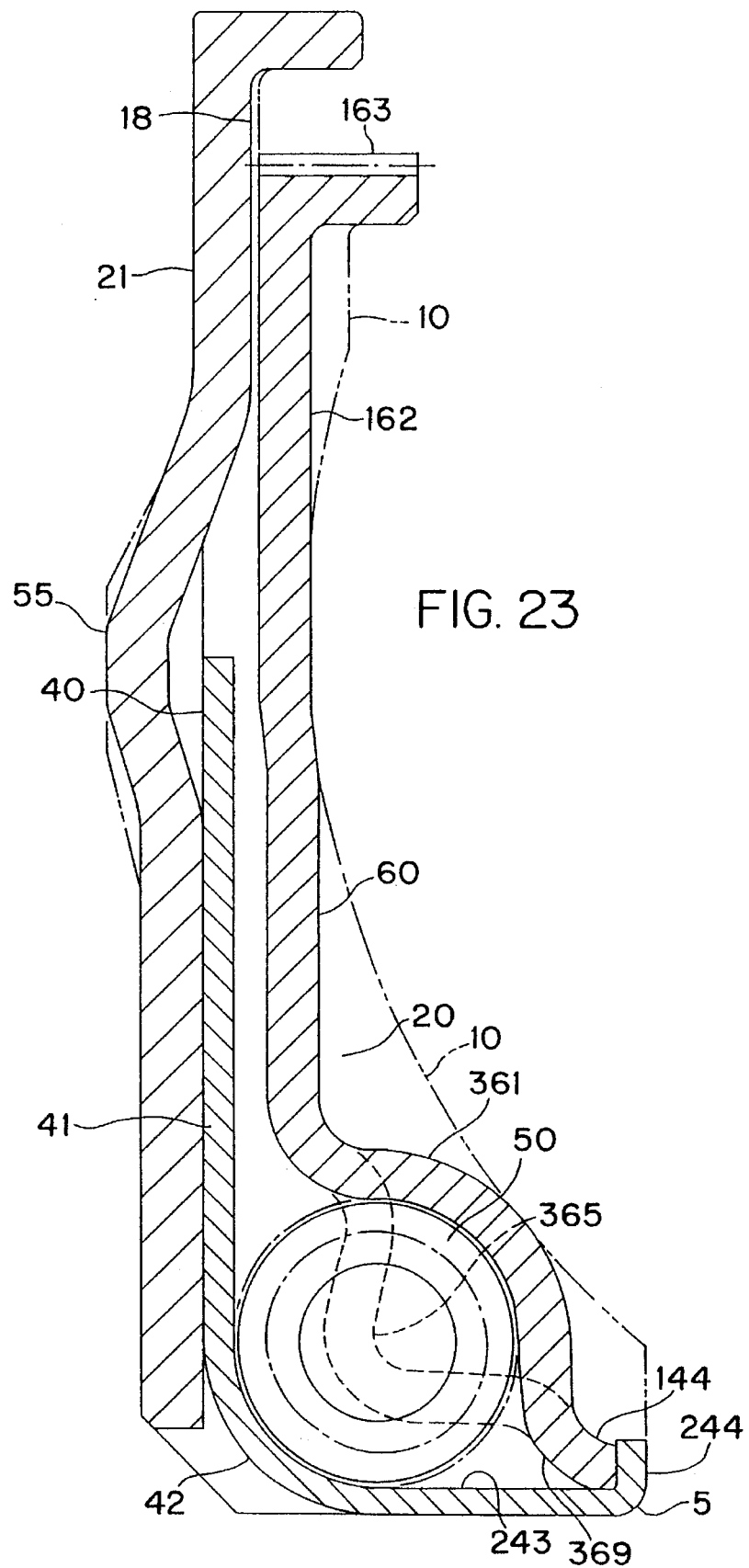
FIG. 23 shows, on a larger scale, the lower part of FIG. 22.

In FIG. 22, the torsion damper 20 comprises an input part 40 which is adapted to be coupled in rotation to the casing 2, and more precisely to the first shell member 5 of the latter, an output part 60 which is adapted to be coupled in rotation to the turbine wheel 10, and resilient members or springs 50, arranged to act circumferentially and working between the two parts 40, 50. The damper 20 thus works between the components 5 and 10 as in the preceding figures.

More precisely, the input part 40 and output part 60 are arranged coaxially, being movable with respect to each other circumferentially against the resilient members 50. As in FIGS. 1 to 21, they are annular in shape.

In FIGS. 22 to 28, the input part 40 is in the form of a guide ring 40, while the second part, or output element 60, constitutes the damper plate. These parts 40, 60 are of metal.

The guide ring 40 (FIGS. 22 to 28) comprises a retaining and support portion 42 and engagement portions 145 for the purpose, respectively, of providing external retaining support for the resilient members 50, and of permitting the engagement of the latter, while the damper plate 60 also has a retaining and support portion 361 together with engagement portions 365, for the purpose of, respectively, providing internal retention for the resilient members 50, and engagement with them.

In accordance with one feature (FIGS. 22 to 50), a torsion damper of the type described above is characterised in that the engagement portions 365 of the damper plate are in the form of sinuous knee portions extending from the inner periphery to the outer periphery of the retaining portion 361 of the damper plate 60.

In FIGS. 22 to 28, the guide ring 40 includes a transverse plate portion 41 which lies against that face of the piston 21 which is directed towards the damper plate 60, in opposed relationship to the shell member 5. This plate portion 41 is fastened by riveting to the piston 21, which in this example is of metal. The piston 21 has extruded portions 170 which, for this purpose, pass through openings 47 formed in the portion 41.

The head of the portion 170 is subsequently upset so that the rivets project directly from the piston 21. The guide ring 40 is thus releasably coupled to the casing 2 through the piston 21, which in this example is of smooth form, with the shell member 5 carrying an annular friction liner 24 secured transversely to its outer periphery for frictional cooperation with the outer periphery of the piston 21, oriented generally transversely, so as to constitute a clutch, the piston of which is rotatably carried on the hub 18 via the torsion damper 20 in a manner to be described below.

The plate portion 41 is extended at its outer periphery by the annular retaining and support portion 42 of the springs.

This portion (FIG. 23) defines a half shell 42, and retains the resilient members 50 externally, in particular against centrifugal force. It follows the shape of the spring 50.

Thus the portion 42 has in cross section a portion that is partly rounded, and which is joined at its inner periphery to the plate portion 41 and is extended at its outer periphery by an axially oriented annular flange 143.

It will be noted that it is above all the rounded portion 42 that retains the springs 50, and that it follows the shape of these latter. The same is true for the retaining portion 361.

The metallic damper plate 60 includes the integral annular retaining and support portion 361, which is extended towards the axis of the assembly at its inner periphery by a plate portion 162, oriented generally transversely and having at its inner periphery a hub which is formed with teeth 163, for coupling it in rotation with the hub 18 of FIG. 1 having external teeth.

The plate portion 162 thus extends parallel to the piston 21, and is arranged to be coupled to the turbine wheel 10 via its hub 18.

The retaining portion 361 also has the form of a half shell, and retains the resilient members 50 internally. The retaining portions 42, 361 are in facing relationship with each other in accordance with an axis of symmetry which is inclined with respect to the radial axis of symmetry of the springs 50, and accordingly they are annular in shape. They support the springs 50 both internally and externally. The guide ring 40 surrounds the damper plate 60.

The portion 361 is joined at its inner periphery to the plate portion 162 through a rounded zone, and at its outer periphery, through a rounded peripheral zone, to an axially oriented annular flange 368.

The flange 368 stiffens the portion 361, just as the flange 143 stiffens the portion 42. In addition, the flange 143 guides the damper plate 60 via its flange 368. The flange 368 is slotted locally to define snap-fitting lugs 243 which are described below. In this way, an axially oriented peripheral flange 144 is formed which is shorter than the flange 368. The retaining portion 361 thus includes at its outer periphery two profiles 144 and 368 which are directed axially away from the piston 21.

The portion 361 is interrupted locally by the knee portions 365. These knee portions 365 have an axially oriented portion which extends radially inwardly of the flange 143, and which joins the flange 368 through a rounded zone 369.

The axially oriented portion of the knee portion 365 is joined internally, through a rounded section, to an inclined portion which is itself joined through a rounded section to the inner periphery of the portion 361.

The metallic guide ring is also interrupted locally by two series of lugs 46, 145, parallel to each other and acting as abutments for the resilient members 50. The lugs 46, 145 thus define engagement portions for the circumferential ends of the springs 50.

The lugs 145 are formed by upsetting the material inwardly, and they extend radially inwardly with respect to the outer peripheral flange 143, being axially oriented.

Thus, part of the flange 143 and of the portion 42 is deformed inwardly so as to form engagement lugs 145, without any severance of the metal plate. In a modification, the inward deformation of material may lead to severing of the latter and to the formation of deformations or knee portions. The lugs 145 then project from the retaining portion 142.

The engagement lugs 46 are formed by pressing and bending of the transverse portion 41. These lugs 46 extend axially over a short length, radially inwardly of the lugs 145 and in alignment with the latter and with the knee portions 365.

The guide ring 40 thus has a generally U-shaped cross section in the region of the lugs 145, 46, one of the branches of which, 46, is shorter than the other, so as to define a window inwardly of the lug 46 (FIG. 25).

Figure 24:
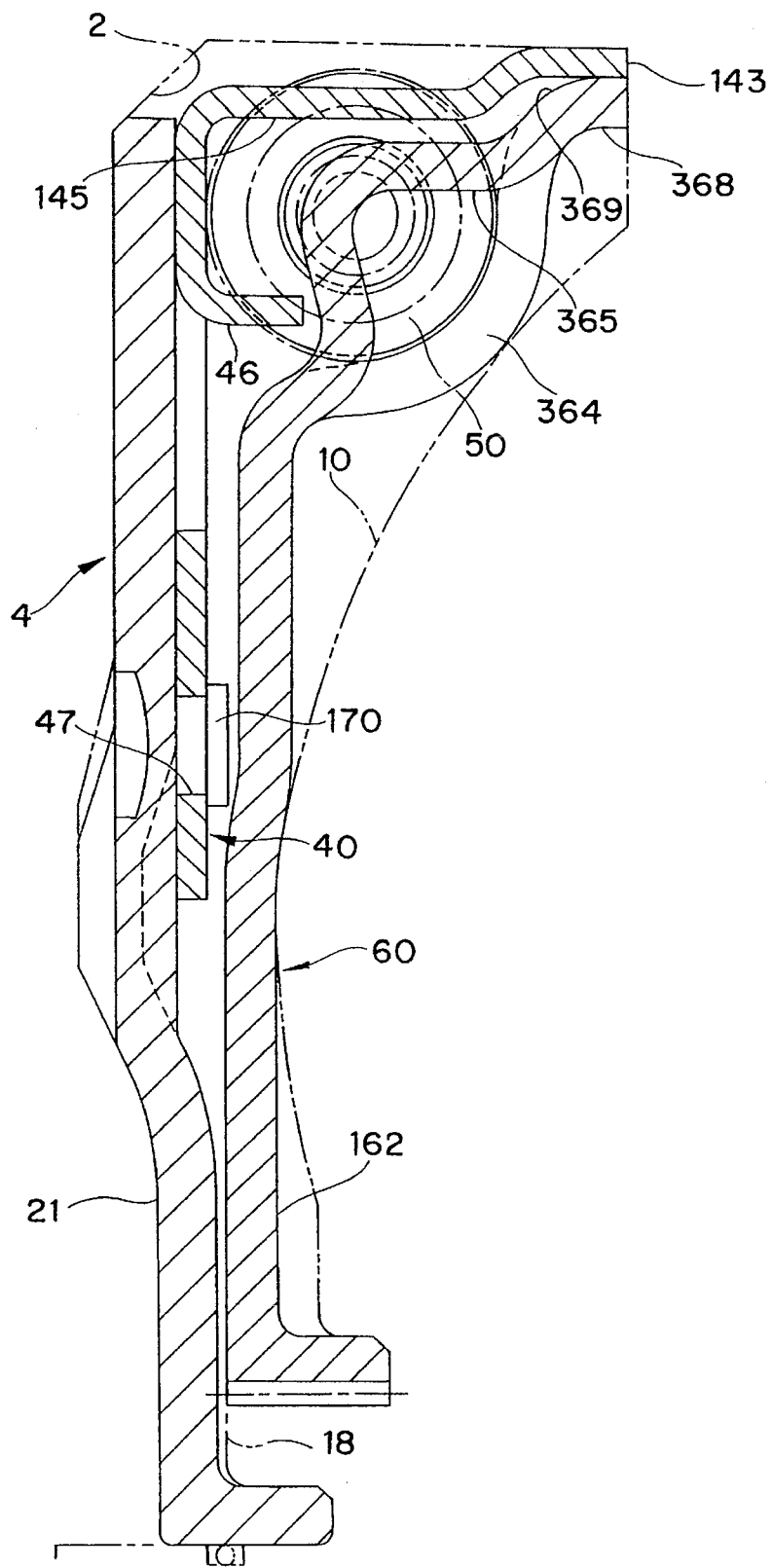
FIG. 24 shows, on a larger scale, the upper part of FIG. 22.
Figure 27:
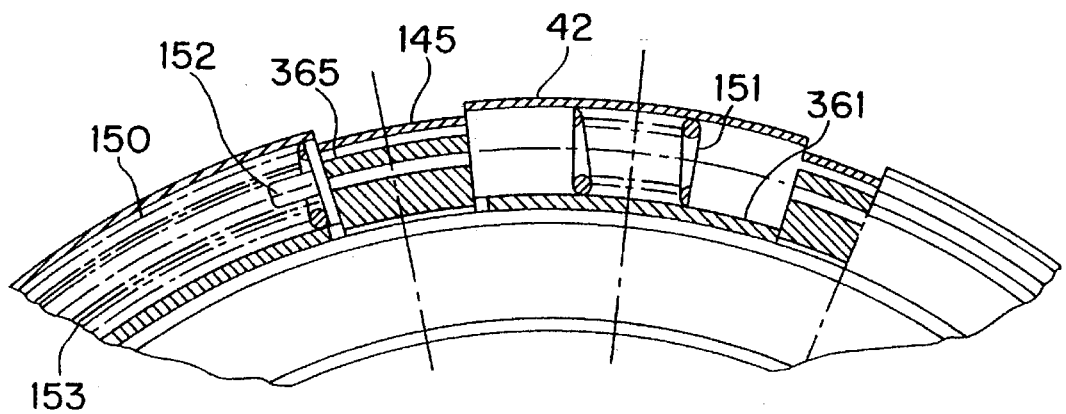
FIG. 27 is a view on a larger scale of the ringed portion 27 in FIG. 25.
Figure 28:
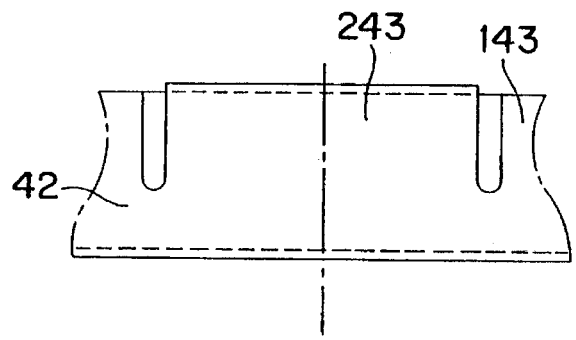
FIG. 28 is a view in the direction of the arrow 28 in FIG. 25.

Thus, the lugs 145 are joined through a rounded portion to the axial flange 143 of the ring 40. The lugs 145 extend outwardly of the axial portion of the knee portions 365, parallel to the latter. Accordingly, the knee portions 365 extend in their axial portion radially outwardly of the axial axis of symmetry of the resilient members 50, and in their inclined portion they intercept the radial axis of symmetry of the resilient members (FIG. 24).

These inclined portions are accordingly oblique with respect to the radial axis of symmetry of the resilient members 50. The same holds true in all the figures.

The inclined portions are inclined towards the plate portion 41 and piston 21, extending from the inner periphery of the portion 361 to the axial portion of the knee portion 365, so as to increase the length of the lugs 46 and of the axial portion of the knee portion.

Thus the knee portions 365 have a generally V-shaped cross section, with a rounded summit, with respect to their axis of symmetry.

In a modification, it is of course possible also to incline the axial portions of the knee portions, according to particular applications. The V may thus be opened up to a greater or lesser extent.

Here, the resilient members comprise two series of coil springs 150, 153-151. The springs 150, 153 of the first series are mounted concentrically one within the other, and bear at each of their circumferential ends on cup-shaped thrust inserts 152 (FIG. 27), having a nose which penetrates into the inner springs 153.

These thrust inserts 152 are arranged to bear on the sides of the lugs 46, 145 and knee portions 365. As will be understood, the sinuous shape of the knee portions 365 enables a maximum length to be given to the lugs 46.

The thrust inserts 152 are then supported on the radially inward side by the lugs 46, and on the radially outward side by the lugs 145 which are parallel to the lugs 46.

The thrust inserts 152 are supported centrally by the sinuous knee portions 365.

The damper plate is thus robust, and the engagement surfaces offered by the lugs 46, 145 and by the knee portions 365 to the springs 150, 153 via the thrust inserts 152 are maximised.

In accordance with a further feature, by making use of these engagement elements 46, 145 and 365, it becomes possible to mount a floating spring 151 between two consecutive series of engagement elements 145, 46, 365.

The said springs 151 are part of the above mentioned second series, and they accordingly lie in alternating relationship, circumferentially, with the springs 150, 153. The springs 151 are shorter than the springs 150, 153 and are stiffer. The springs 150, 153-151 are held in position by the retaining portions 42, 361.

Figure 33:
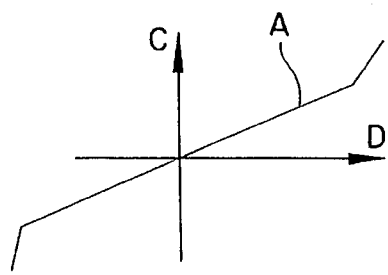
FIG. 33 is a diagram showing the characteristic curve of the torsion damper of FIGS. 22 to 28.

The characteristic curve A of the damper is shown in FIG. 33 (in which the torque transmitted is shown at C, while the relative angular displacement between the input part 40 and the output part 60 is indicated at D), and it has a double slope.

Thus, in a first phase, only the springs 150, 153 of the first series are working, and thus in a second phase, after the clearances have been taken up, the springs 151 start to act and become compressed.

Preferably, according to one feature, the springs 150, 153 are formed in advance into a curve, since they are preferably very long circumferentially.

According to a further feature, the flange 143 of the retaining portion 42 is interrupted locally by blind slots (FIG. 28), which define the snap-fitting lugs 243, having a transverse end flange 244 which is directed towards the axis of the assembly.

In this example, the lugs 243 are solid. In a modification, windows may be formed in these latter so as to improve their flexibility.

The flange 244 is so dimensioned that it is capable of cooperating by abutting engagement with the side of the peripheral flange 144 of the damper plate 60.

The circumferential length of the slotted flange 144 is such that the lug can deflect angularly into the interior of this flange during the relative angular movement between the damper plate 60 and the ring 40.

The lugs 243 thus retain the damper plate 60 by means of their flange 244, in such a way that it is possible to create a unitary sub-assembly which cannot be lost, and which is capable of being handled and transported, comprising the piston 21 and the torsion damper 20, after the springs 150, 153-151 and thrust inserts 152 have been fitted by snap-fitting the damper plate 60 in the lugs 243. This sub-assembly is finally fitted over the hub 18. It will be appreciated that the fitting of the damper plate 60 with the ring 40 by snap-fitting is facilitated due to the fact that the ring 40 is less thick than the damper plate 60, so that the lugs 243 easily deflect during the snap-fitting of the damper plate 60.

It will be appreciated that the rounded zone 369 of the damper plate 60 facilitates the deflection or spreading of the lugs 243. This zone 369 thus constitutes a ramp which enables the lugs 243 to be deflected during the relative approaching movement of the guide ring 40 with respect to the damper plate 60.

After the final fitting of the sub-assembly, a slight clearance exists between the flange 244 and the side of the flange 144.

It will be noted that the piston 21 has stiffening ribs 55.

Six lugs 145 and therefore six knee portions 365 and six lugs 46 are provided here, together with three springs 150 and three springs 151.

The arrangement is of regular form as shown in FIGS. 25 and 26.

All this does of course depend on the application.

Figure 30:
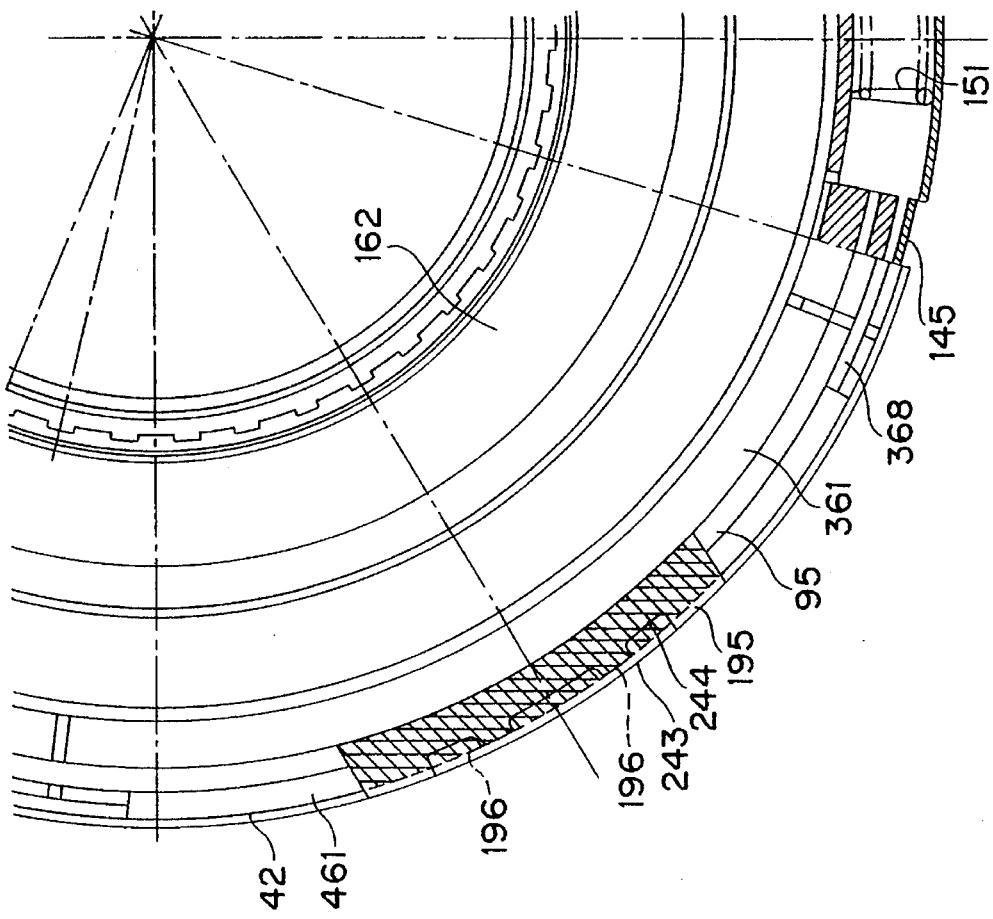
FIG. 30 is a partial view in the direction of the arrow 30 in FIG. 29.
Figure 29:
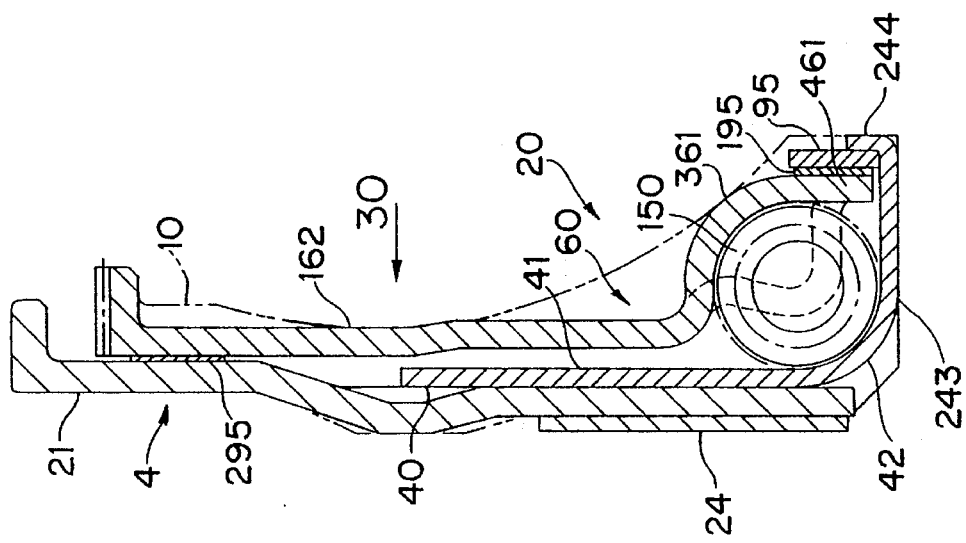
FIG. 29 is a view similar to FIG. 23, for another embodiment.

It is of course possible to take advantage of the creation of the snap-fitting lugs 243, 244 in order to bring a ring 95 into axial engagement between the flange 244 and the outer periphery of the support portion 361 (FIGS. 29 and 30).

In that case, the outer periphery 461 of the retaining or support element 361 is mainly transversely oriented in the region of the springs 150, with only a small part of the flange 368 being preserved in the vicinity of the engagement knee portions.

The ring 95 carries, locally at the level of each lug 243, a friction liner 195 which is fixed to the ring 95, for example adhesively. The line 195 is arranged to engage frictionally against the portion 461.

The liner 195 is wider in the circumferential direction than the lug 243, for the purpose of good application of the liner 195 against the portion 461.

It is of course possible to reverse the structures, and to secure the liner 195 adhesively on to the portion 461.

Similarly, it is possible to interpose an annular friction liner 295 between the plate portion 162 and the piston 21, preferably at the inner periphery of these latter (FIG. 29). In that case, the plate portion 162 constitutes a resilient element with respect to the piston 21, which is stiffened by means of the ribs 55. It is thus possible easily to grip the liner 295 resiliently between the piston 21 and the plate portion 162.

Thus, during the relative angular displacement between the damper plate 60 and the piston 21 fixed to the guide ring 40, friction occurs between the liner 295, secured to one of the elements 162, 21, and the other one of the elements 21, 162 which is not in fixed relationship to the liner. Further friction occurs between the liners 195 and the portion 461 of the support element 361.

It will be noted that here, the friction liner 24 is in fixed relationship to the piston 21. That does of course depend on the application.

It will also be noted that the snap-fitting lugs 243 prevent rotation of the ring 95. In this connection, this ring has radial lugs projecting outwardly so as to support the liners 195 (FIG. 30). The lugs 243 overhang these lugs, so that the ring 95 is prevented from rotating by mating cooperation, and it is also blocked against axial movement between the flange 244 and the portion 461 of the support element 361.

It will be noted (FIG. 30) that the ring 95 passes under the flange 368. In this embodiment (FIG. 30) the flange 244 is notched, in this example at two locations referenced at 196 in FIG. 16, so as to enable the lugs 243 to be lifted with the aid of a tool so as to permit the snap-fitting of the damper plate and of the ring 95 to the guide ring 40 carrying the springs 150 and piston 21.

The present invention is of course not limited to the embodiment described. In particular, it is possible to simplify the damper plate 60 and to omit its plate portion.

Thus in FIG. 31, the generally transverse portion 241 of the guide ring 40, lying against the piston 221, is secured by rivets 270 to the piston 221 which carries the friction liner 24. This piston has at its outer periphery an axially oriented annular flange, with which the retaining portion 242 of the ring 40 comes into contact.

Figure 3:
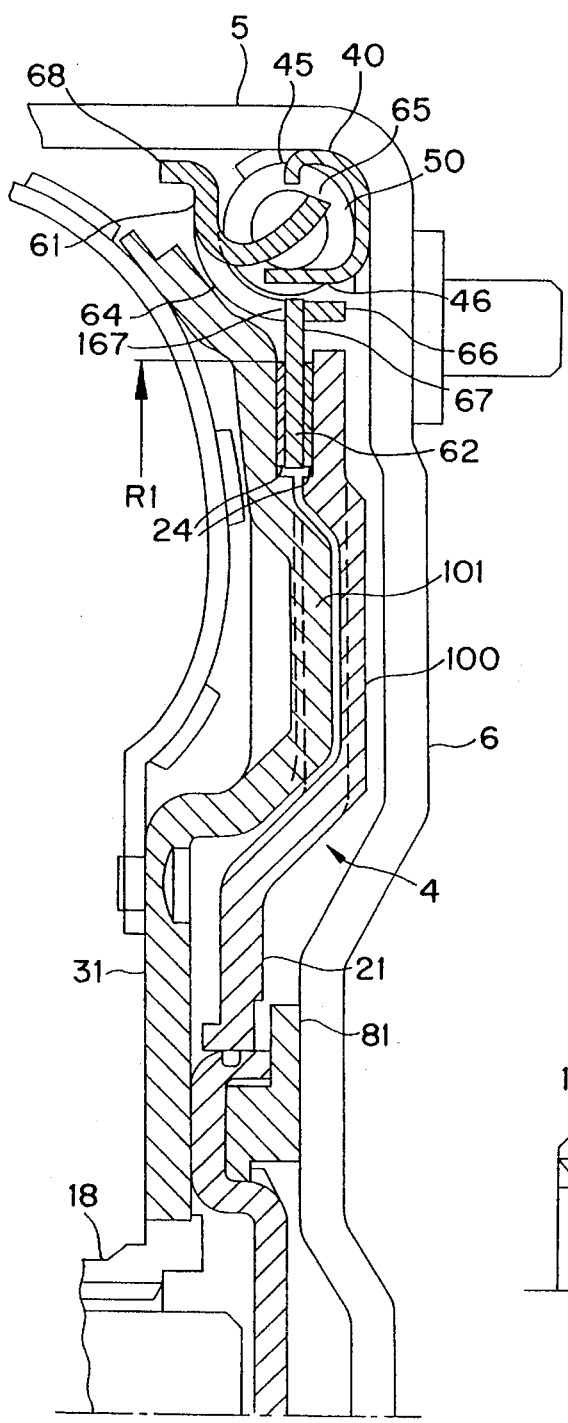
FIGS. 3 and 4 are views in axial cross section, offset circumferentially and showing the lock-up clutch in accordance with the invention.
Figure 4:
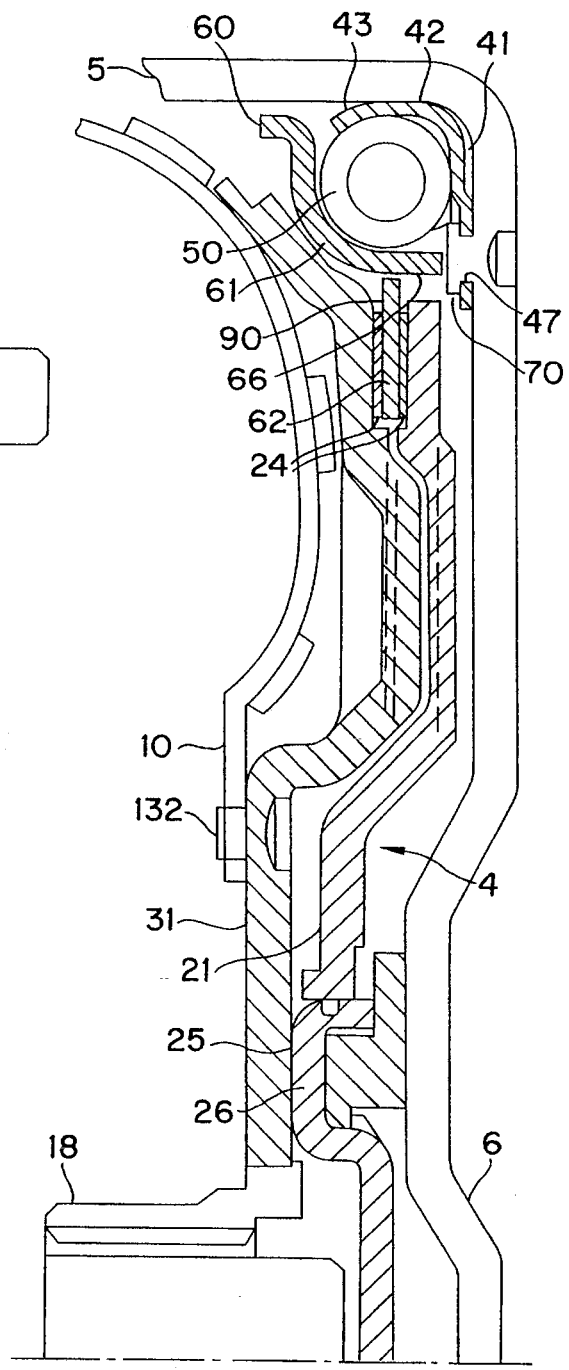

It will be noted that the portion 242 has a cross section of circular shape, with an arc of a circle extending over more than 90°, and that the arrangement is the opposite of that in FIG. 3, with the springs making local contact with the damper plate 60. The portion 242 extends beyond the radial axis of symmetry of the springs (FIG. 31).

The piston 221 is part of the lock-up clutch, and is adapted to grip the friction liner 24 between the latter and the shell member 5 of the casing 2.

The portion 242 is embossed at 343 for the retention and positioning of the springs 50 according to one feature of the invention. The springs 50 are prevented from moving axially in one direction by the junction zone of the retaining portion 242 with the inner portion 241 of the guide ring 40, in this example its transverse portion 241, and in the other direction by the discontinuous embossed element 343, which is in the form of a rounded bead described below.

This bead 343 is formed at the junction of the annular retaining portion 242 with an axially oriented annular peripheral stiffening flange 348 which extends the said portion.

In this example the damper plate 60 is secured by welding at 563 directly to the turbine wheel 10. Since the portions 565 for abutment of the springs 50 are of a sinuous shape similar to that in FIG. 1, these portions 565 are jointed through a rounded portion to the portion 562 of the damper plate 60 for securing and supporting it on the turbine wheel.

The portion 562 follows the shape of the turbine wheel 10.

In FIG. 32, the damper plate 60 is also fastened directly to the turbine wheel 10, by welding at 663. This welding is carried out at the level of the rounded junction portion of the retaining portion 661.

As in FIGS. 22 to 38, the guide ring 40 has clipping lugs 243 for their retention with respect to the damper plate 60, and more particularly for cooperation of the transverse flange 244 of the lugs 243 with the side of the outer periphery of the damper plate 60.

This damper plate 60 has an axially oriented portion at its inner and outer periphery. These axial portions are joined to each other successively through a rounded first support zone, a transverse portion and a rounded second portion 662. It is this portion of revolution 662 that will facilitate the snap-fitting on to the damper plate of the guide ring 40 which has been furnished in advance with the springs 50.

The portion 662 thus enables the lugs 243 to be raised, and is then joined to an axially oriented annular peripheral flange of the damper plate 60.

In that figure, it is the damper plate 60 that carries the guide ring, by contrast with the embodiments in FIGS. 22 to 30.

The sinuous engagement knee portions 665 extend between the two axial portions.

In this example, the transverse portion 341 of the guide ring 40 is extended at its inner periphery by an axially oriented flange 342 which is pierced at 380, so as to define mortices and for fitting of a disc 62 which carries friction liners 24, fixed on each of its faces and adapted to be gripped between the shell member 5 and the piston 321 so as to constitute a clutch. The ring 40 is then joined releasably to the shell number 5 via the piston 321. Thus, the input part of the damper contains a support element (the guide ring), together with a disc, with a connection of the tenon and mortice type between these latter.

Here, the guide ring 40 is thus joined to the input part of a clutch proper, with the input part consisting of a disc having at its outer periphery tenons 167 meshing with the openings 380, which in this example are closed (and which can be seen in FIG. 40 described below).

The piston 321 is mounted on the shell member 5 for rotation with it, in a manner described below.

Thus the torsion damper is mounted in series with the clutch proper.

Accordingly, a double faced lock-up clutch is created, which enables a high torque to be transmitted and which has a small axial size due to the fact that the piston 321 extends into the central part of the turbine wheel 10, while the torsion damper is fitted at the outer periphery of the turbine wheel 10.

The guide ring 40 can of course (FIG. 34) be fitted directly on the shell member 5, to which end it has extruded rivets 70 passing through the apertures 47 in the guide ring 40.

In that case, the disc 62 (FIG. 37) meshes, by means of the tenons 167, with rounded slots 480 which are provided in the retaining portion 761. These slots 480, which are in the form of mortices, are more numerous than the slots 764 that are associated with the abutment portions 765, which are of sinuous form in accordance with the invention.

As in FIG. 32, the lugs 243 cooperate with the side of the outer peripheral edge 368 of the damper plate 60, so as to retain the latter and to constitute a sub-assembly comprising the torsion damper 20 and the shell member 5. In this case, the peripheral flange 368 is not slotted, by contrast with the embodiment in FIG. 2, because there is not sufficient axial space.

Figure 34:
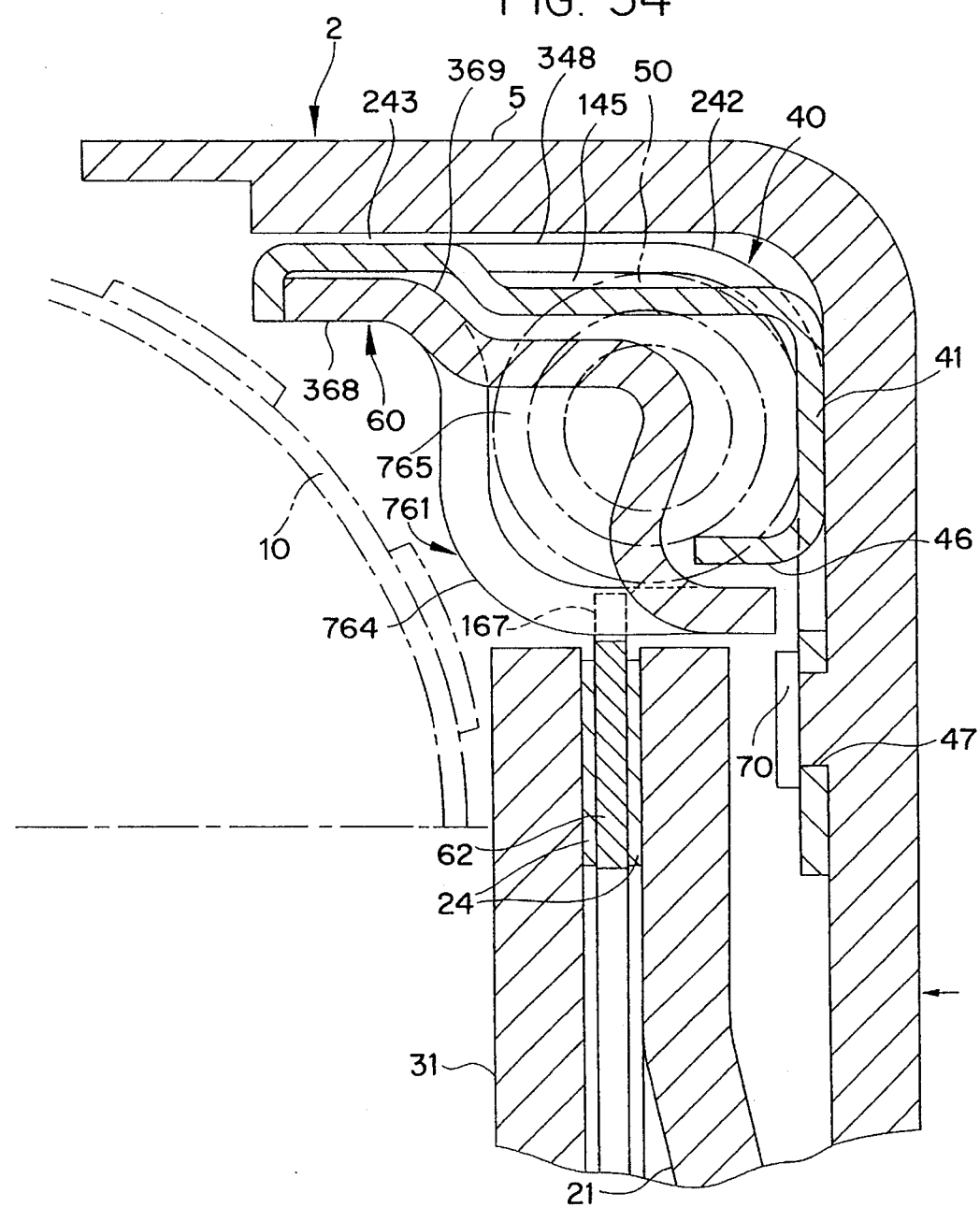
FIG. 34 is a partial view in cross section taken on the line 34—34 in FIG. 37, showing a further embodiment.
Figure 35:
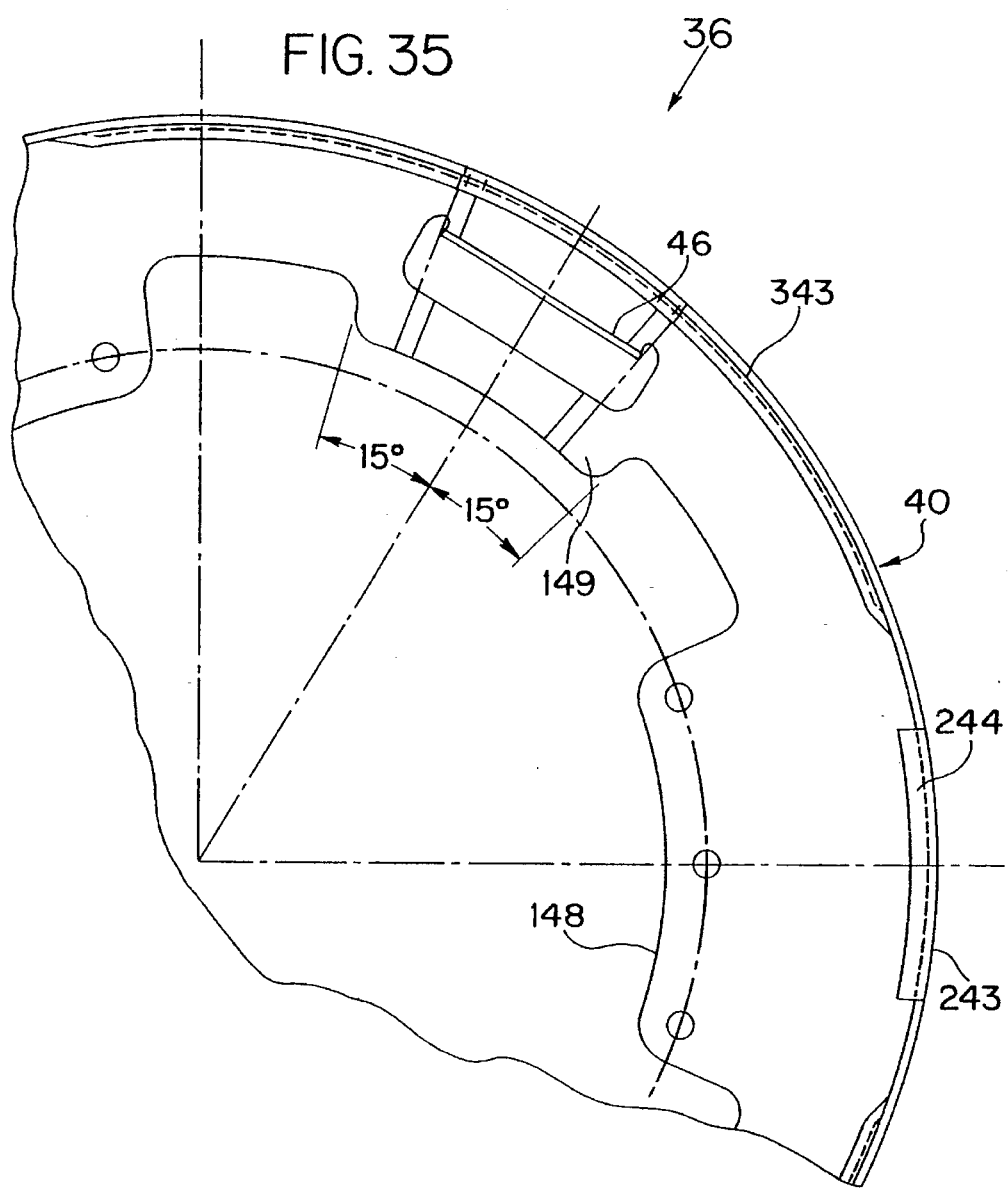
FIG. 35 is a partial view of the guide ring of the torsion damper in FIG. 34.

In FIG. 34, it is the guide ring 40 that retains the damper plate and carries the latter, while in FIG. 32 the opposite is the case.

It will be noted that the guide ring has tongues 148 for securing it to the shell member 5, and tongues 149 in which the lugs 46 and 145 are formed.

A bead 343, which is discontinuous here, is also provided in the guide ring 40 as in FIGS. 31 and 32, for retaining and positioning the springs 50.

Figure 36:
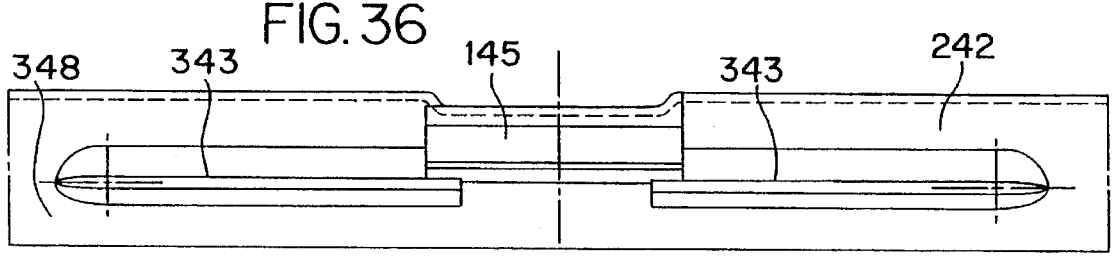
FIG. 36 is a view in the direction of the arrow 36 in FIG. 35.

As can be seen best in FIG. 36, the beads 343 mainly extend circumferentially on either side of the lugs 145, and have a circumferential length such that it takes account of the relative angular displacement between the damper plate 60 and the ring 40.

In all cases, the length of the beads is such that the circumferential end concerned of the spring 150 always remains in contact with this bead 343.

The position of this bead 343 does of course take account of the dimensioning of the springs 150.

In this example, the beads 343 are not formed on the abutment and central portions of the lugs 145.

The resilient members 50 here consist only of coil springs 150, 153, fitted concentrically and extending between two consecutive engagement knee portions 765. These springs bear on the thrust inserts 152.

As in FIG. 25, these springs 150, 153 are supported by the retaining portions 242 of the guide ring 40 and 761 of the damper plate 60.

It will be noted that the disc 62, with its liners 24, is adapted to be gripped between the piston and a counter piston 31, as in FIGS. 11 to 15.

A double faced lock-up clutch is thus created as in FIG. 32, with the damper plate being carried on the hub 18, for releasable rotation with it, by virtue of the counter piston 31 which is in fixed relationship to the hub 18 and turbine wheel 10.

Various combinations are of course possible.

Figure 39:
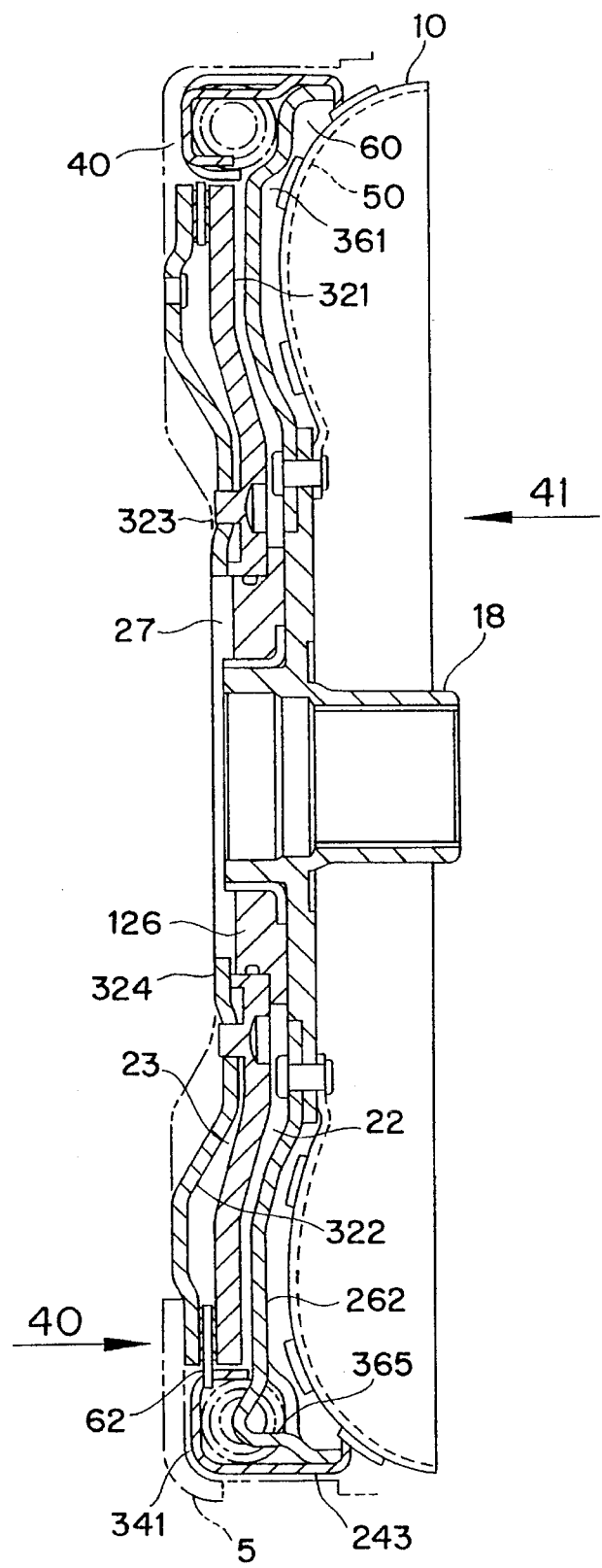
FIG. 39 is a view in axial cross section similar to 22, for yet another embodiment.

Thus, in FIG. 39 the damper plate 60 has a configuration which is similar to that in FIG. 2, while the guide ring 40 has a configuration which is similar to that in FIG. 22 and the resilient members have a configuration similar to that in FIG. 37.

Only one spring 150 may of course be provided between two consecutive knee portions 365.

A radial plate element 262 extends parallel to the piston 361, and extends inwardly the retaining portion 361 in which the knee portions 365 are formed. The plate element 262 is secured directly by riveting to the hub 18 of the turbine wheel 10.

The disc 62 then has tenons 167 which mesh with the apertures 380 formed in the inner periphery of the transverse portion 341, together with the axially oriented flange referenced at 342 in FIG. 12.

The friction liners 24 of the disc 62 are adapted to be gripped between the piston 321 and a reaction member 322 which is adapted to be secured by riveting to the shell member 5. All of these components are part of the lock-up clutch.

It is of course possible to reverse the structures, that is to say the liners 24 may be in fixed relationship to the piston 321 and to the member 322, with the disc 62 having no liners. The same is the case in all of the modifications in which two liners 24 are disposed on either side of the disc 62. These liners may be in fixed relationship to the components between which the assembly consisting of the disc 62 and liners 24 is gripped.

The member 322 enables precise machining of the shell member 5 to be avoided.

Thus, this member 322 has apertures 47 through which rivets projecting from the shell member 5 pass. This member 322 has at its inner periphery lugs 324 which mesh with notches 325 (FIG. 40), which are formed in grooves 27 of a two-material thrust ring 126 which is mounted on the hub 17. This ring is accordingly coupled in rotation to the casing 2 and to the shell member 5 via the member 322.

In a known manner, the grooves 27 are arranged for the pressurisation and depressurisation of the chamber 23 delimited by the piston 321 and by the member 322. Another chamber 23 is delimited by the damper plate 60 and the piston 321.

Thus, by variation of the pressures in the chambers 22 and 23, the piston 321 is displaced in one direction or the other so as to grip or release the liners 24.

The ring 126 is interposed axially between the radial plate element which is formed integrally with the turbine wheel 18, and the shell member 5.

The piston 321 slides along this ring 126, and is coupled in rotation to the member 322 by means of projecting studs 323 with which it is provided at its inner periphery, with the studs 323 penetrating into complementary openings formed in the member 322, which has a friction face at its outer periphery for the friction liners of the disc 62, and more precisely for gripping of the liners 22, fixed to the disc 62, between the piston 321 and the member 322.

The piston 321 is thus carried in rotation on the shell member 5, and slides axially along the rings 126.

The guide 40 has snap-fitting lugs 243 as mentioned above.

It is of course possible to omit the member 322, and in that case the friction liners of the disc 62 are arranged to be gripped between the piston 421, carried in rotation on the shell member 5 via the welded ring 126, and the shell member 5 of the clutch proper (FIG. 42).

To this end, the piston 421 is mounted for axial movement on the ring 126, being coupled to the latter through loose coupling means 423.

These loose coupling means are formed in a member 422 which is secured by welding on the piston 421. In this case, the ring 126 is secured by welding to the shell member 5.

More precisely, the member 422 has at its inner periphery splines which are arranged to engage with splines formed at the outer periphery of a radial flange 424, with which the ring 126 is provided for this purpose.

The member 422 thus meshes with the flange 424. The member 422 is secured by welding on that face of the piston 421 which faces away from the shell member 5.

The member 422 may of course be secured by riveting on the piston 421.

It is of course possible to reverse the structures (FIG. 43), with the member 422 then being disposed on that face of the piston 421 which faces towards the shell member 5.

It will be appreciated that the embodiments of FIGS. 42, 43 and 44 are suitable for coupling the piston 321 of FIG. 22 to the shell member 5 for rotation with it, and it is for this reason that in FIG. 43, the disc 62 which is arranged to mesh with the closed apertures in the form of mortices 380 of FIG. 12, is shown diagrammatically.

Thus, in FIGS. 42 and 43, the piston 421 is adapted to grip the friction liners 24 of the disc 62 between the latter and the shell member 5 of the lock-up clutch.

In a modification, the coupling may be achieved by means of tangential tongues, or through a mating cooperation.

In all of FIGS. 22 to 43, the torsion damper has only two metallic components, which are easily made by press forming, for the retention of the resilient members, with the retaining portions of the components being in facing relationship with each other, with an axis of symmetry which is inclined with respect to the radial axis of symmetry of the resilient members 50 or springs 50.

FIGS. 44 to 51 show a fluid coupling apparatus 1 for a motor vehicle, of the kind comprising a casing 2 having a transverse wall 6 which is adapted to be coupled in rotation to a driving shaft, a turbine wheel 10 in fixed relationship to a hub 18 which is adapted to be coupled in rotation to a driven shaft 17, a central thrust ring 336 secured to the transverse wall 6 of the casing 2 for rotation therewith and interposed axially between the transverse wall 6 and the hub 2, and a lock-up clutch 4 working between the turbine wheel 10 and the transverse wall 6 of the casing 2 in a manner similar to the embodiments of FIGS. 32, 39, 43.

The clutch 4 comprises a damper plate 60 in fixed relationship to the turbine wheel 10, a guide ring 40 attached to the damper plate 60, resilient members 50 working circumferentially between the guide ring 40 and the damper plate 60, a disc 62 which is coupled in rotation to the guide ring 40 with axial mobility, through a mating type coupling 480, 267 of the tenon and mortice type, friction liners 24 disposed on either side of the disc 62, a piston 21 which is mounted for axial movement along the thrust ring 336 and which is adapted to cause the friction liners 24 and the disc 62 to be gripped between itself and the transverse wall 6 of the casing 2, and rotational coupling means 523, 111 working between the piston 21 and the transverse wall 6 of the casing 2. The coupling means comprise a coupling member 522 which is interposed axially between the piston 21 and the transverse wall 6 of the casing 2, the coupling member 522 being in fixed relationship to the transverse wall 6 of the casing 2.

In accordance with one feature, a fluid coupling apparatus of the type described above is characterised in that the piston 21 has embossed portions 111 which are directed towards the transverse wall 6 of the casing 2 and which have lateral edges 115, while the coupling member 522 has at its inner periphery lugs 523, each of which is adapted to make engagement with at least one of the lateral walls 115 of the embossed portions 111.

The lock-up clutch 4 works between the turbine wheel 10 and the transverse wall 6. It slides by means of its piston 21, which is shaped as a hub at its inner periphery for this purpose, on the thrust ring 336 that is fixed to the wall 6, in this example by welding. This arrangement leads to simplification of the coupling member 522, which accordingly has no additional function to perform. The driven shaft 17 is hollow in the centre, while the thrust ring has, at its end adjacent to the wall 6, grooves which can be seen in particular in FIG. 20.

The piston delimits a chamber 23 which is closed by the wall 6, together with a chamber 22 which is delimited by the turbine wheel 10.

A sealing gasket is of course fitted on the ring 336 and the thrust ring 336, which has grooves for the flow of oil passing through the central bore of the shaft 17 and reaching the chamber 23 through the grooves.

In FIG. 44, the hub 18 has at one of its axial ends (that which is nearest to the wall 6), a transverse hub plate 330 on which the turbine wheel 10 and the damper plate 60 are fastened. The components 10 and 60 are arranged on either side of the hub plate 330.

More precisely, in accordance with a feature of the invention, these fastenings are obtained by riveting. The hub plate 330, which is here of metal, has an integral first series of rivets 333 directed axially towards the wheel 10, together with a second series of rivets 332 directed axially towards the piston 21 and wall 6. These rivets are formed by extrusion from the hub plate 330.

In this way, economy of rivets is achieved, while the fastenings of the turbine wheel 10 and the damper plate 60 on either side of the plate 330 are robust because only one component (the damper plate 60 or the wheel 10) is secured to the plate 330, by the rivets 332, 333 respectively.

This arrangement enables storage of rivets to be avoided.

The rivets 332 are of course in circumferential alternation with the rivets 333. To this end, the damper plate 60 is extended radially towards the axis of the assembly, by means of a ring element 262 which is secured at its inner periphery to the plate 330 by means of the rivets 332.

This ring element 262 is provided with a plurality of apertures, one of which can be seen in the upper part of FIG. 1, and which reduce the weight of the hub plate and facilitate flow of the oil.

This plate 60 has an annular support portion 361 for the internal retention of the resilient members 50, which in this example are coil springs shown in broken lines in the upper part of FIG. 1 for greater clarity. The plate 60 also has abutment portions 365 for engagement with the circumferential ends of the springs 50.

More precisely, as in FIGS. 22 to 43, these abutment portions are formed in knee portions of sinuous shape, which extend from the inner periphery to the outer periphery of the retaining portion 361 of the plate 60.

These knee portions are generally V-shaped and have an axially oriented portion joined through a rounded zone to an axially oriented, annular, outer peripheral flange 368 of the retaining portion.

The axially oriented portion of the knee portion is joined through a rounded portion to an inclined portion, which is itself joined to the inner periphery of the retaining portion 361.

The guide ring 40 is so shaped as to provide external retention of the springs 50. It is annular in shape like the plate 60, and is of metal like the plate 60. In this example, the guide ring has a generally L-shaped cross section, with an axially oriented portion directed towards the turbine wheel 10, and a transversely oriented portion 341 directed towards the axis of the assembly.

This guide ring 40, and also the retaining portion 361 of the plate 60, is fitted at the outer periphery of the turbine wheel 10 and shell member 5.

As in FIGS. 22 to 43, the guide ring has snap-fitting lugs 243 which are formed from an interruption of the flange 42, the lugs 243 having at their free end a transverse flange 244 directed towards the axis of the assembly. This flange 244 is arranged to cooperate with the side of the peripheral flange 368 of the damper plate 60, which is slotted so as to come into engagement with the flanges 244 of the lugs 243, and thus to prevent the lugs from rotating.

The guide ring is in this way attached to the damper plate 60, and a unitary assembly is formed which can be handled and transported, and which comprises the damper plate 60, the guide ring 40 and the springs 50, and which is then fixed on the hub plate 330.

In a modification (FIGS. 49 and 50) the lugs 343 may be rigid, and the flange 244 may be completed by being bent over towards the axis of the assembly, in contact with the side of the peripheral flange 368, by hot bending with the aid of a tool, for example with high frequency heating.

As can be seen in the figures, the lugs 243 are short, and their thickness is reduced, in this example progressively, so as to make it easier to bend them.

As a result of this arrangement, the lugs 343 remain in constant engagement with the flange 368, which is slotted for the purpose, in particular, of preventing any interference with the turbine wheel.

Figure 49:
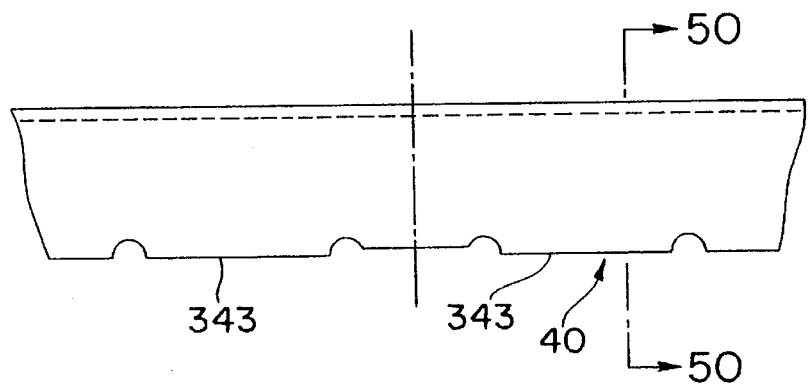
FIG. 49 is a partial view showing gripping lugs before they are bent back for attachment of the guide ring to the damper plate in a second embodiment.
Figure 50:
FIG. 50 is a view in partial cross section taken on the line 50—50 in FIG. 49.

It will be noted that in FIG. 49, the lugs 343 are grouped in pairs spaced apart at 120° with respect to each other. This does of course depend on the application.

In a modification, the flange 244 may be formed in advance, and a bayonet type fitting is then made. For this purpose, the flange 368 is embossed locally so as to accommodate the flange 244. In this example the embossing operation leads to the formation of a channel section. This flange 368 is slotted over a large circumferential extent, greater than that which corresponds to the angular displacement between the damper plate 60 and the ring 40, and after axial engagement of the flange 244 through the embossed portion of the flange 368, the flange 244 is rotated, after which a member 465 for engagement with the springs 50 is fitted.

Figure 51:
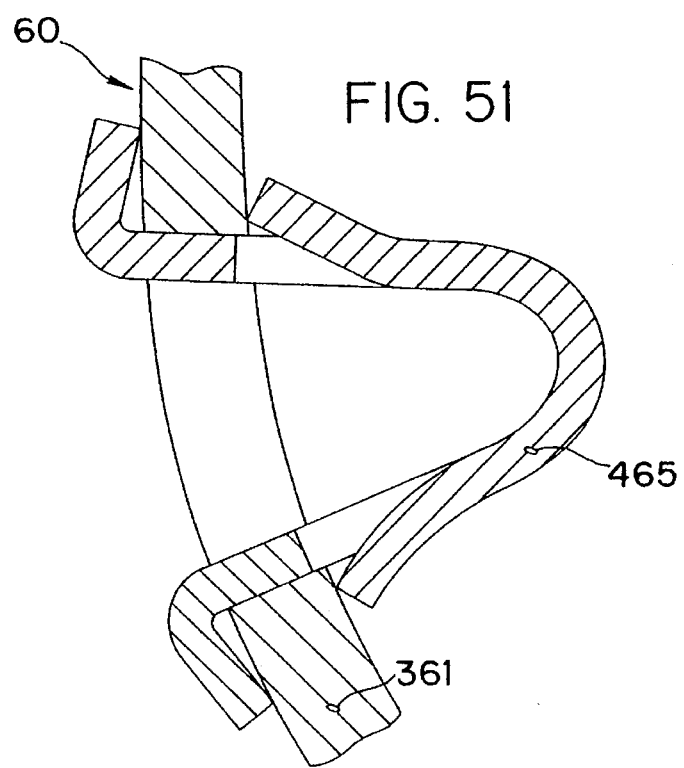
FIG. 51 is a partial view showing a modification of the abutments for the springs.

In this example this fitting takes the form of snap-fitting, and as can be seen in FIG. 51, the damper plate 60 is formed with apertures. The lugs are then unable to escape.

In a modification, it is possible to fit the engagement member first, and then to proceed with fastening by welding or riveting instead of by snap-fitting.

The disc 62 has at its outer periphery axially oriented lugs 267 which penetrate into notches 480 (FIG. 46) which are formed at the inner periphery of the transverse portion 341 of the guide ring 40.

In this way, a joint of the tenon and mortice type is created, and the disc 62 is coupled in rotation to the guide ring 40, while being movable axially with respect to the latter.

This is made possible due to the fact that the points of engagement for the circumferential ends of the springs 50 are defined by components 140 which are attached locally by welding on the guide ring 40, inside the latter.

The engagement member 140 follows the shape of the guide ring, and accordingly has a cross section which is L-shaped, with one of its edges being extended by a rounded portion.

The member 140 is very robust, and lies in facing relationship with the abutment portion 365 of the damper plate (see the lower part of FIG. 44).

Thus, manufacture of the guide ring 40 is simplified.

The friction liners 24 are in this example secured adhesively on the disc 62, and extend on either side of the latter.

The face of the transverse portion 6 which is in facing relationship with the ring 24 is machined so as to form a friction surface for the ring 24 concerned.

In a modification, the rings 24 may of course be secured respectively on the piston 21 and on the wall 6. The piston 21 extends radially inwardly of the lugs 267, and has in its central part embossed portions 111 which stiffen the piston 21.

These embossed portions 111, as can be seen in FIG. 2, are made by partial press forming using a tool which displaces material.

Figure 45:
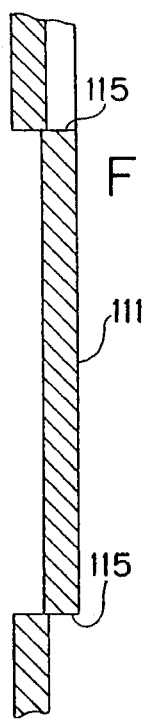
FIG. 45 is a partial view in transverse cross section showing one of the embossed portions of the piston.
Figure 46:
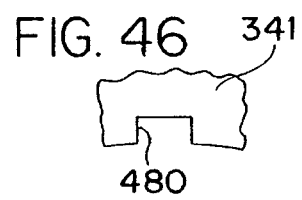
FIG. 46 is a partial view showing a slot for rotary coupling with the disc, formed in the guide ring.
Figure 47:
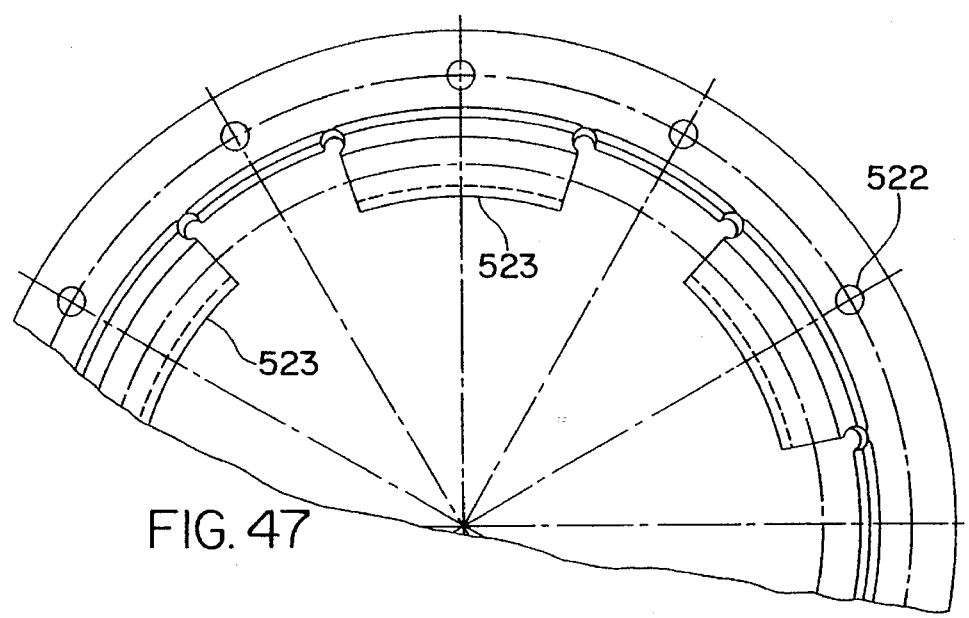
FIG. 47 is a partial view of the coupling member, in the direction of the arrow 47 in FIG. 44.
Figure 48:
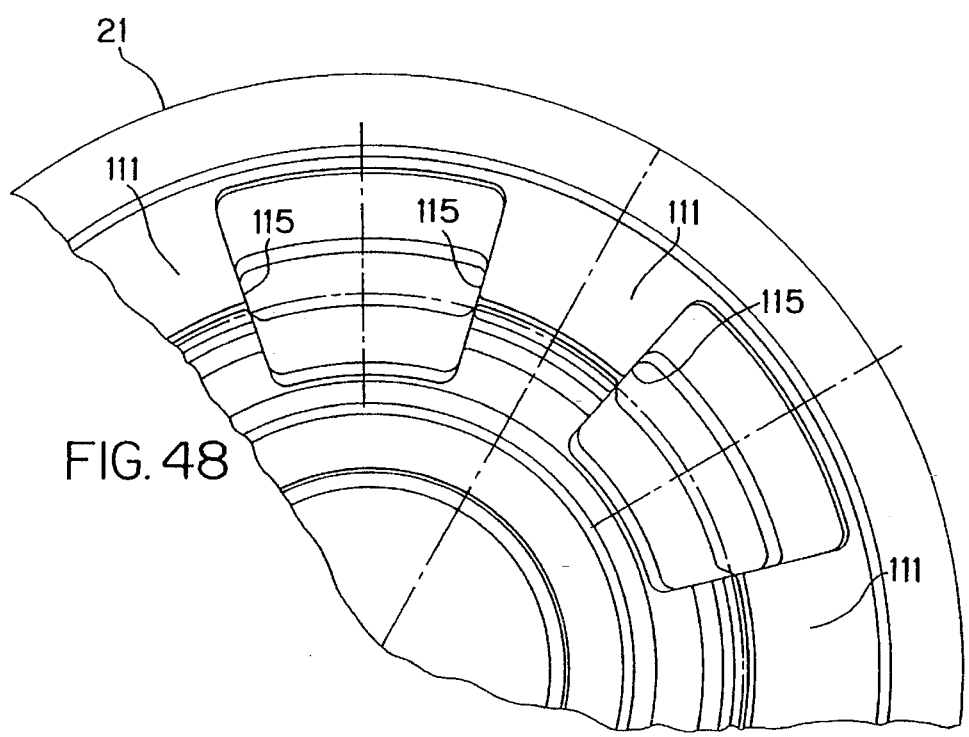
FIG. 48 is a partial view of the piston, in the direction of the arrow 48 in FIG. 44.

The lateral edges 115 of the embossed portions 111 are then very precise, and a light band of material exists between the embossed portion 111 and the main part of the piston 21, so that the latter is fluid-tight (FIG. 45).

The coupling member 522 is secured by riveting to the wall 6. The rivets 524 are formed by extrusion of the wall 6, which is of metal like the member 522 and the piston 521.

The coupling member 522 is annular in shape, and has a peripheral portion of angular shape which is traversed, via apertures (FIG. 47), by the fastening rivets 524. This annular portion has lugs 523 of curved shape at its inner periphery. These lugs 523 extend towards the turbine wheel 10, and their cross section is generally that of a letter C.

It will be appreciated that this shape fits well with that of the embossed portions 111, which have in cross section a pointed form, with a rounded summit facing towards the wall 6.

These lugs 523 are gentle in action and are adapted to cooperate through their edges with at least one of the lateral edges 115 of the embossed portions 111. In a first embodiment, each lug 523 cooperates with one of the lateral edges 115 of an embossed portion 111, so there are two lugs 523 associated with each embossed portion 111.

The circumferential length of the lugs 523 is smaller than that which separates two successive embossed portions 111.

In this example (FIGS. 46 and 47), the circumferential width of the lugs 523 is increased so that the latter corresponds to the circumferential distance between two successive embossed portions 111. In this case, the lug 523 cooperates with two lateral edges 115 of two successive embossed portions 111.

A small fitting clearance does of course then exist between the circumferential ends of the lugs 523 and the lateral edges 115 of the successive embossed portions 111.

There are advantages in this embodiment. In this connection, six embossed portions 111 are here spaced apart circumferentially at regular intervals, and the coupling member 522 has six complementary lugs. The number of lugs 523 is thus half that in the first embodiment.

In addition, these lugs 523 are more robust than those in the first embodiment, because they are wider.

In a modification, it is possible to associate a single lug 523 with one embossed portion 111. The lugs may then be mounted alternately, with one of the lugs 523 cooperating with one of the edges 115 of the embossed portion 111, while the other lug cooperates with the other edge 115 of another embossed portion 111.

In every case, good contact between the sides of the lugs 523 and the edges 115 can thus be obtained. It will be appreciated that good sliding movement of the piston 121 can take place due to the configuration of the rotational coupling means 111, 523 in accordance with the invention.

In addition, these coupling means 523, 111 are located on a circumference having a diameter which is greater than that of the thrust ring 336.

This ring 336 carries a friction ring 331 at its free end. The ring 336 is hollow in the centre and has for example a change of diameter, not shown, for centring the ring 331.

This interposed ring, as shown in FIG. 1, may be secured with respect to the hub 18 by means of pins penetrating into apertures which are formed in the hub plate 330.

The ends of the pins are upset so that the ring 331, which is here of a plastics material, is joined, for example by ultrasonic welding, to the hub plate 330.

Thus in operation, the oil may reach the chamber 223 in order to pressurise or depressurise the latter, and the ring 331 limits the displacement of the piston 21.

When the lock-up clutch is engaged, the piston 21 grips the liners 24 between itself and the wall 6, so that the movement is transmitted directly from the shell member 5 to the hub 18 through the clutch 4, and especially through the guide ring 40, springs 50 and damper plate 60 of the latter. Vibrations are therefore filtered out, and a double-faced clutch is formed which is able to transmit a high torque.

For disengagement of the lock-up clutch 4, the chamber 23 is pressurised, and the piston 21 is displaced towards the ring 331 so as to release the liners 24.

The disc 62 can then slide axially, due to the engagement of its axially oriented lugs 267 with the notches 480.

The disc 62 then remains in permanent engagement with the guide ring 40, and there is no danger of its escape from the latter.

It will be appreciated that the lock-up clutch 4 is very reliable and operates in favourable conditions, its lugs 523 being fitted, with the embossed portions 111, generally radially at the level of the inner periphery of the turbine wheel 10 and radially outwardly of the rivets 333, 332 and of the ring 336.

The guide ring may of course have the same shape as that shown in FIG. 19, with the abutments for the springs being integral with the guide ring 40.

The resilient members 50 may of course be mounted in pairs, and the thrust ring 336 may be secured by riveting to the central part of the wall 6.

The configuration of FIG. 19 can be envisaged, but this leads to an increase in the complication of the coupling member.

In couplings of the tenon and mortice type acting between one of the elements comprising the guide ring 40, with the damper plate 60, and the disc 62, it is of course possible to reverse the structures, with the elements 40–60 then having tenons and the disc having mortices.

For example, in FIG. 44 the transverse portion 341 of the ring 40 may have tenons engaging with mortices which are formed accordingly in the disc 62, which accordingly has at its outer periphery an axially oriented annular flange in which the mortices are formed.

In FIG. 32, the flange 342 may be divided into lugs (like a comb) which penetrate into complementary notches formed in the outer periphery of the disc 62.

In FIG. 45, the embossed portions may be joined through rounded zones to the main portion of the piston 21.

Finally, it is possible to reverse the positions of the damper plate 60 and guide ring 40, so that the damper plate 60 surrounds the ring 40. For example in FIG. 31, the damper plate 60 and guide ring 40 will then be reversed.

We claim:

1. A torsion damper for a lock-up clutch (4) adapted to work between a driving element (2) and a driven element (10) of a fluid coupling apparatus (1), comprising two coaxial parts (40, 50) which are movable with respect to each other against circumferentially acting springs (50), namely an input part having a guide ring (40) and an output part (60) having a damper plate, in which the guide ring (40) comprises a retaining portion (42, 142, . . . ) in the form of a half shell which is of annular form with a circular cross section and engagement portions (45, 145, . . . ) for respectively retaining the springs (50) and engaging them, while the damper plate (60) also has engagement portions (65, 165, . . . ) for providing engagement with the springs (50), characterised in that the damper plate (60) has a retaining portion (61, 161, . . . ), for radially retaining the springs (50), being in the form of a half shell which is of annular form with a circular cross section in that said engagement portions of the damper plate (60) are carried by said retaining portion of the damper plate (60), and in that said retaining portions of the guide ring (40) and of the damper plate (60) are offset axially with respect to each other.

2. A damper according to claim 1, in which the retaining portion (361, 461, 561, 661, 761) comprises an inner and an outer periphery characterised in that engagement portions (365, 565, 665, 765) of the damper plate (60) are formed in abutment knee portions of sinuous shape, extending from the inner periphery to the outer periphery of the retaining portion (361, 461, 561, 661, 761) of the damper plate (60).

3. A damper according to claim 2, characterised in that said knee portions are generally V-shaped.

4. A damper according to claim 3, characterised in that said engagement knee portions comprise an axially oriented portion joined through a rounded zone (369, 662) to an axially oriented peripheral annular flange (144, 368) of retaining portion, and in that said axially oriented portion of the engagement knee portion (365, 565, 665, 765) is joined through a rounded portion to an inclined portion, which is itself joined to a rounded portion at the inner periphery of said retaining portion.

5. A damper according to claim 4, in which the guide ring (40) is interrupted locally by first and second series of lugs (46, 145) defining engagement surfaces for said resilient members, with the lugs (46) of the second series extending axially below the lugs (145) of the first series projecting from the retaining portion (42, 242) of the guide ring (40), characterised in that the lugs (145) of the first series are formed by inward deformation of material, and in that said lugs (145) of the first series extend axially above the axially oriented portions of the engagement knee portions (365, 565, . . . ) of the damper plate (60).

6. A damper according to claim 2, in which the resilient members (50) consist of coil springs, characterised in that at least some of said coil springs (150, 153) bear at their circumferential ends on the engagement knee portions (365, 565, . . . ) through thrust inserts (152).

7. A damper according to claim 6, characterised in that some of the coil springs (151) are mounted for floating movement between two series of engagement knee portions (365, 565, . . . ), being retained by retaining portions (42, 242–361, . . . ) of the guide ring (40) and of the damper plate (60).

8. A damper according to claim 1, characterised in that the retaining portion (242) of the guide ring (40) is embossed for retaining and positioning the resilient members (150, 153).

9. A damper according to claim 8, in which the retaining portion (242) of the guide ring (40) is extended by an axially oriented annular peripheral flange (348), characterised in that an embossed portion (343) is formed at the junction of the retaining portion (342) with said flange (348).

10. A damper according to claim 1, in which the guide ring has at its outer periphery an axially oriented annular flange (143, 348), characterised in that said flange (143, 348) is interrupted locally so as to define snap-fitting lugs (243) having a transverse flange (244) directed towards the axis of the assembly, and in that said flange (244) is adapted to cooperate with the side of a peripheral flange (143, 348) of the damper plate (60) so as to form a unitary assembly that can be handled and transported.

11. A damper according to claim 10, characterised in that said peripheral flange (348) of the damper plate (60) is slotted at the level of the snap-fitting lugs (243).

12. A damper according to claim 10, characterised in that a ring (95), associated with at least one friction liner (195), is interposed between the flange (244) of the snap-fitting lugs and the outer periphery of the retaining portion (361) of the damper plate (60).

13. A damper according to claim 12, characterised in that the outer periphery (461) of said retaining portion (361) of the damper plate (60) is mostly oriented transversely for cooperation with said friction liner or liners (195).

14. A damper according to claim 1, characterised in that one of the elements comprising the guide ring (40) and damper plate (60) is coupled in rotation to a disc (62) through a coupling of the tenon and mortice type, with said disc (62) being adapted to be gripped between a piston (21, 121, 231, 321, 421) and a counter piston (5, 31).

15. A damper according to claim 14, in which the guide ring (40) has a transverse portion (341), characterised in that said transverse portion (341) is extended at its inner periphery by an axially oriented flange (342) which is pierced so as to define mortices (380) and for the fitting of a disc (62) having at its outer periphery tenons (167) which mesh with said mortices (380).

16. A damper according to claim 14, in which the guide ring has a transverse portion (341), characterised in that said transverse portion (341) has, at its inner periphery, notches (480) into which there penetrate axially oriented lugs (267) defined on said disc (62) at its outer periphery.

17. A damper according to claim 14, characterised in that the retaining portion (61, 361) of the damper plate (60) has mortices (380) for the fitting of the disc (62), which has at its outer periphery tenons (167) which mesh with said mortices.

18. A damper according to claim 17, characterised in that the mortices (64, 164) consist of slots, each of which is closed by a shoulder (67) adapted to limit the displacements of the disc (62) by cooperation with the appropriate tenon (167) of the latter.

19. A lock-up clutch adapted to work between a casing (2) and a turbine wheel (10) of a fluid coupling apparatus, being of the kind comprising a piston (21) which is oriented generally transversely, characterised in that it includes a torsion damper according to claim 1, and in that the guide ring (40) is fixed to said piston (20), which is adapted to grip a friction liner (24) between the latter and a shell member (5) which is part of the casing (2) of the fluid coupling apparatus.

20. A lock-up clutch fitted between a casing (2) and a turbine wheel (10) of a fluid coupling apparatus, being of the kind comprising a piston (21) which is oriented generally transversely, characterised in that it includes a torsion damper according to claim 17, in that the guide ring (40) is fixed to a shell member (5) of that casing (2) of the fluid coupling apparatus, and in that the damper plate (60) is mounted releasably in rotation on a hub (18), which is fixed with respect to the turbine wheel (10) through a counter piston (31) that is fixed with respect to the hub (18), and for the gripping of friction liners in fixed relationship with the disc (62), between the piston (21) and the counter piston (31).

21. A lock-up clutch fitted between casing (2) and turbine wheel (10) of a fluid coupling apparatus, characterised in that it includes a torsion damper according to claim 15, and in that the damper plate (60) is secured by welding (563, 663) to the turbine wheel (10).

22. A lock-up clutch fitted between a casing (2) and a turbine wheel (10) of a fluid coupling apparatus, characterised in that it includes a torsion damper according to claim 1, in that the damper plate (60) is fixed by welding (563) to the turbine wheel (10), and in that the guide ring is fixed to a piston (221) which is adapted to grip a friction liner (24) between the latter and a shell member (5) of the casing (2).

23. A lock-up clutch, for a fluid coupling apparatus (1) between a driving element (2) and a driven element (18), and comprising a torsion damper (20) according to claim 1, a piston (21, 121) mounted for axial movement with respect to the driving element (27), at least one friction liner (24) associated with the piston and adapted to be gripped between said piston and a counter piston (31, 131), characterised in that the input part (40) of the torsion damper (20) is adapted to be put into fixed relationship with the driving element (2), in that the output part (60) comprises two elements, namely a support element (61, 161, 261) for the springs (50) and a disc (62) which is movable axially with respect to the support element (61, 161, 261), being coupled in rotation with the support element (61, 161, 261), in that friction liners (24) are disposed on either side of said disc (62), in that said friction liners (24) are adapted to be gripped between the piston (21) and the counter piston (31) which is fixed with respect to the driving element (2) for rotation with the driving element (2), in that the piston (21) is mounted for axial movement with respect to the counter piston (31, 131), being coupled in rotation to the counter piston (31, 131), in that the piston (21) is mounted for movement on a piston shaft (25) which is fixed to the counter piston (31), and in that the support element (61) has an abutment (67) facing towards the counter piston (31, 131) in order to limit the displacement of the disc (62).

24. A clutch according to claim 23, characterised in that axially movable rotational coupling means (100, 101–200) work directly between the piston (21, 121) and the counter piston (31, 131).

25. A clutch according to claim 24, characterised in that said rotational coupling means comprise protuberances (101) of the counter piston (31), for engagement in recesses (100) of the piston (21).

* * * * *